US007460116B2

(12) United States Patent
Okamoto

(10) Patent No.: US 7,460,116 B2
(45) Date of Patent: Dec. 2, 2008

(54) DISPLAY ELEMENT AND DISPLAY DEVICE

(75) Inventor: Shigetsugu Okamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/033,963

(22) Filed: Feb. 20, 2008

(65) Prior Publication Data

US 2008/0150424 A1 Jun. 26, 2008

Related U.S. Application Data

(63) Continuation of application No. 10/869,982, filed on Jun. 16, 2004, now Pat. No. 7,336,272.

(30) Foreign Application Priority Data

Jun. 18, 2003 (JP) ............................ 2003-173992
Mar. 17, 2004 (JP) ............................ 2004-076284

(51) Int. Cl.
*G06F 3/038* (2006.01)
*G09G 5/00* (2006.01)

(52) U.S. Cl. ........................................ 345/211; 345/76

(58) Field of Classification Search ......... 345/211–214, 345/87, 88, 90, 92, 82, 83, 76, 77; 315/169.1, 315/169.3; 313/506, 483
See application file for complete search history.

(56) References Cited

U.S. PATENT DOCUMENTS

| | | | | |
|---|---|---|---|---|
| 5,077,553 | A | 12/1991 | Buzak | |
| 5,272,472 | A | 12/1993 | Buzak | |
| 5,627,457 | A | 5/1997 | Ishiyama et al. | |
| 6,897,838 | B2 | 5/2005 | Okamoto | |
| 2004/0041761 | A1 | 3/2004 | Sugita et al. | |
| 2004/0076018 | A1 | 4/2004 | Okamoto | |
| 2005/0057580 | A1 * | 3/2005 | Yamano et al. | 345/690 |

FOREIGN PATENT DOCUMENTS

| | | |
|---|---|---|
| JP | 11-344949 | 12/1999 |
| JP | 2001-083934 | 3/2001 |
| JP | 2003-216108 | 7/2003 |
| JP | 2003-303687 | 10/2003 |

* cited by examiner

*Primary Examiner*—Ricardo L Osorio
(74) *Attorney, Agent, or Firm*—David G. Conlin; Steven M. Jensen; Edwards Angell Palmer & Dodge LLP

(57) ABSTRACT

A display element included in a display device is provided with a TFT circuit portion and a pixel aperture portion to which an organic EL element material is applied and which emits light in accordance with a current from the TFT circuit portion, as well as a scanning signal line electrode, a data signal line electrode and a power source line electrode. The resistance Re of the power source line electrode can be reduced, because the electrode width at a portion where the power source line electrode is in contact with the pixel aperture portion is larger than the electrode width at other portions. The resistance ratio Rx/Re between the electrode resistance Re and a combined resistance Rx of a current path from the power source line electrode through the pixel aperture portion is at least $10^5$. Thus, a display element and a display device are realized, which have little luminance variation within the display screen, which have a high numerical aperture, a high light emission efficiency and a long lifetime.

5 Claims, 13 Drawing Sheets

DISPLAY ELEMENT AND DISPLAY DEVICE

CROSS-REFERENCE TO RELATED APPLICATION(S)

This application is a continuation of application Ser. No. 10/869,982 filed on Jun. 16, 2004, which claims priority to Japanese application no. 2003-173992 filed on Jun. 18, 2003 and Japanese application no. 2004-76284 filed on Mar. 17, 2004, the disclosures of which are expressly incorporated herein by reference.

BACKGROUND OF THE INVENTION

1. Field of the Invention

The present invention relates to display elements in which light emission is controlled by the amount of current flowing through an electro-optical element, such as an organic EL element or an inorganic EL element, as well as to display devices including such display elements.

2. Description of the Related Art

To date, there are display devices whose light emission sources are electro-optical elements whose optical characteristics are changed by applying electricity, such as organic EL (electroluminescent) elements, inorganic EL elements or light emitting diodes. In such display devices, a plurality of display elements each including an electro-optical element are arranged in a matrix, and the current necessary for lighting the electro-optical elements is supplied to the electro-optical elements from a power source supplying a predetermined current. These electro-optical elements are controlled to a predetermined luminance by applying a predetermined data signal voltage (or current).

Ordinarily, a display element includes a plurality of TFT (thin film transistor) elements, an electro-optical element, an auxiliary capacitance, a data signal line for applying data signals, a scanning signal line for applying scanning signals, and a power source line for supplying current from the power source. Here, the size (occupied surface area) of the electro-optical element in the display element is determined by the size (occupied surface area) of conductors and the elements other than the electro-optical element. For example, in order to make the numerical aperture of the pixels as large as possible, the size of the elements other than the electro-optical element should be made small and also the size of the conductors, in other words the width of the electrodes, should be small. If that is the case, then the numerical aperture can be made large, and the light emission efficiency of the electro-optical element increases, so that it is possible to drive with a comparatively low voltage. As a result, also the power consumption becomes relatively low.

However, the larger one tries to make the numerical aperture, the thinner the electrode width of the power source line needs to be made, so that the resistance of the power source line electrode increases. Consequently, when current is supplied from the power source line electrode to the display elements, the voltage drop at the display elements further away from the current supplying power source increases the greater the numerical aperture is made. This means that there are variations in the drop of the voltage applied by the current supplying power source to each of the display elements. When the voltage applied to the electro-optical element becomes small due to this voltage drop, then also the emitted luminance of the electro-optical element decreases. Therefore, the larger one tries to make the numerical aperture, the bigger are the variations that occur in the luminance of the pixels of the display device. Ordinarily, electro-optical elements such as organic EL elements have diode characteristics, so that the current flowing through the electro-optical element changes exponentially with changes in voltage. Thus, since the luminance of the electro-optical element is lowered exponentially due to the above-described voltage drop, the display device suffers from conspicuous variations or irregularities in luminance, lowering the display quality.

Conventionally, display devices address this problem by suppressing luminance variations on the display screen with the following configurations. For example, there are display devices that are provided with a memory for storing data expressing the image to be displayed and a memory for storing current correction data, which has been set in advance, for correcting the luminance variations, and image data that is corrected in accordance with the current correction data is applied to the display elements (see for example JP H11-344949A). With this configuration, luminance variations can be corrected. Moreover, there are display devices in which the conductors leading from a predetermined driving circuit to the display elements are provided with a predetermined resistance distribution (see for example JP 2001-83934A). This resistance distribution is set such that voltage drops due to the resistance of the conductors are suppressed. Thus, it is possible to reduce luminance variations due to voltage drops.

However, in the configuration disclosed in JP H11-344949A, a new correction circuit including a memory for storing the current correction data becomes necessary. When this correction circuit is provided in a driver portion incorporated in the display panel, the scale of the circuitry increases, which is undesirable. When the scale of the circuitry increases, there are disadvantages with regard to the manufacturing yield, for example. Moreover, with the configuration disclosed in JP 2001-83934A, the resistance distribution of the conductors must be set such that voltage drops due to the resistance of the conductors are suppressed, so that complex design and layout of the conductors becomes necessary.

To do so, the electrode width of the power source line should be increased in order to suppress luminance variations, but in this case, the numerical aperture is decreased, as mentioned above, worsening the light emission efficiency of the electro-optical elements. This causes the problems that the element lifetime is shortened, and the power consumption is increased.

Moreover, in conventional display devices, one pixel is configured by a plurality of sub-pixels, such as three sub-pixels for displaying the three colors for RGB display. In this case, the current for generating the necessary luminance depends on the (light emitting material of the) display elements forming the sub-pixels, so that when the luminance of the various colors deviates from the desired values when displaying white light for example, then a colored hue may be perceived on the display screen.

SUMMARY OF THE INVENTION

It is thus an object of the present invention to provide a display element and a display device, with which variations in the luminance are suppressed and colored hues are suppressed while ensuring a large numerical aperture, without providing special correction circuits or conductors having a complex resistance distribution In order to attain this and other objects of the present invention, a display element in accordance with an aspect of the present invention comprises:

an electro-optical element that is driven by a current;

a control element for controlling the current flowing through the electro-optical element;

a selection element for applying to the control element a data signal for controlling the control element;

a scanning signal line electrode for applying to the selection element a scanning signal for controlling the selection element;

a data signal line electrode for applying to the selection element the data signal; and a power source line electrode for applying to the control element the current for driving the electro-optical element;

wherein a resistance ratio Rx/Re between a resistance Re of the power source line electrode per display element and a resistance Rx of a path of the current flowing through the control element and the electro-optical element, starting at the power source line electrode, is at least $10^5$.

In a display device comprising a plurality of these display elements, the balance of the current flowing from the power source line electrode through the electro-optical element can be adjusted, and the luminance variations can be kept within a predetermined tolerance range without increasing the scale of the circuitry. Therefore, a display element can be provided that has little luminance variations, a high numerical aperture, an excellent light emission efficiency, and a long lifetime.

It should be noted that the pixels of this display device may be constituted by a plurality of display elements. For example, one pixel may be constituted by three sub-pixels displaying the three colors R, G and B, or by four sub-pixels displaying R, G, B and W. In this case, the current for generating the necessary luminance is different for each of the display elements forming the sub-pixels. If the resistance ratios Rx/Re of the display elements forming the sub-pixels of different colors are set to be substantially the same, then the luminance variation among the display elements forming the various sub-pixels can be made small, and it is possible to achieve a uniform display without color hues when displaying white light, for example.

Moreover, it is preferable that the power source line electrode of the display element has a plurality of different electrode widths. With such a configuration, when trying to realize the above-noted resistance ratio in order to design the pixels such that they have a high numerical aperture, the above-noted resistance ratio condition can be met and the display elements can be designed to have the highest numerical aperture by suitably adjusting the electrode width of the power source line electrode.

Furthermore, it is preferable that the power source line electrode's electrode width at a portion adjacent to a region where the electro-optical element is disposed is larger than the power source line electrode's electrode width at other portions. With such a configuration, when trying to realize the above-noted resistance ratio in order to design the pixels such that they have a high numerical aperture, it is possible to set the electrode width to an extent that does not compromise the circuit configuration in regions with a relatively low degree of freedom, such as the TFT circuit portions, and to suitably adjust the electrode width in regions where the electro-optical elements are disposed, so that it becomes easy to design the pixels such that the above-noted resistance ratio condition is met.

Furthermore, when the tolerance value of the current variation is made comparatively large under the comparatively loose condition of making the resistance ratio Rx/Re at least $10^5$, the current variation of display devices having a comparatively low pixel resolution and a comparatively small column pixel number can be kept within the range of tolerance values, but when the comparatively strict condition of making the resistance ratio Rx/Re at least $10^6$ is set, then the current variations of almost all display devices can be kept within the range of tolerance values, even if the tolerance values for current variation are comparatively small.

In accordance with another aspect of the present invention, a display element comprises:

an electro-optical element that is driven by a current;

a control element for controlling the current flowing through the electro-optical element;

a selection element for applying to the control element a data signal for controlling the control element;

a scanning signal line electrode for applying to the selection element a scanning signal for controlling the selection element;

a data signal line electrode for applying to the selection element the data signal; and a power source line electrode for applying to the control element the current for driving the electro-optical element;

wherein the display element forms one of a plurality of types of sub-pixels constituting one pixel; and wherein a resistance ratio Rx/Re between a resistance Re of the power source line electrode per display element and a resistance Rx of a path of the current flowing through the control element and the electro-optical element, starting at the power source line electrode, is substantially the same as the resistance ratio Rx/Re of the other display elements forming the other types of sub-pixels in that one pixel.

In a display device comprising a plurality of these display elements, the resistance ratio Rx/Re of the display elements forming sub-pixels of different colors is set to substantially the same value, so that it is possible to attain a uniform display without color hues when displaying, for example, white.

Moreover, as in the above-described display element, it is preferable that the power source line electrode of this display element has a plurality of different electrode widths. Furthermore, it is preferable that the power source line electrode's electrode width at a portion adjacent to a region where the electro-optical element is disposed is larger than the power source line electrode's electrode width at other portions.

In accordance with yet another aspect of the present invention, a display device comprises an image display portion comprising an arrangement of a plurality of the above-described display elements, and a current supply portion for applying a predetermined current to the power source line electrodes comprised by the display elements.

In a display device including such display elements, a low luminance variation, a high numerical aperture, a superior light emission efficiency, and a long lifetime are achieved by adjusting a balance of the currents flowing from the power source line electrode through the electro-optical elements, without providing a separate circuit for correcting luminance variations or controlling the pixel luminance by adding a correction of the data signal. Furthermore, a uniform display without color hues can be performed.

Furthermore, it is preferable that the current supply portion of this display device applies a current from a plurality of current supply points to power supply line electrodes linked to a plurality of display elements.

With this configuration, the display element column can be expressed as a ladder circuit of multiple stages, and the further the display elements are from the current supply points, the lower is the applied voltage due to the electrode resistance. Thus, a large difference in luminance occurs when comparing display elements far from the current supply points and display elements near the current supply points. Therefore, by providing the power source line electrode with a plurality of current supply points, the positions of the display elements become closer to the current supply points and it is possible to further reduce the luminance variations. Furthermore, a uniform display without color hues can be performed.

These and other objects, features, aspects and advantages of the present invention will become more apparent from the following detailed description of the present invention when taken in conjunction with the drawings.

DESCRIPTION OF THE PREFERRED EMBODIMENTS

The following is a description of preferred embodiments of the present invention, with reference to the accompanying drawings.

Figure 1:
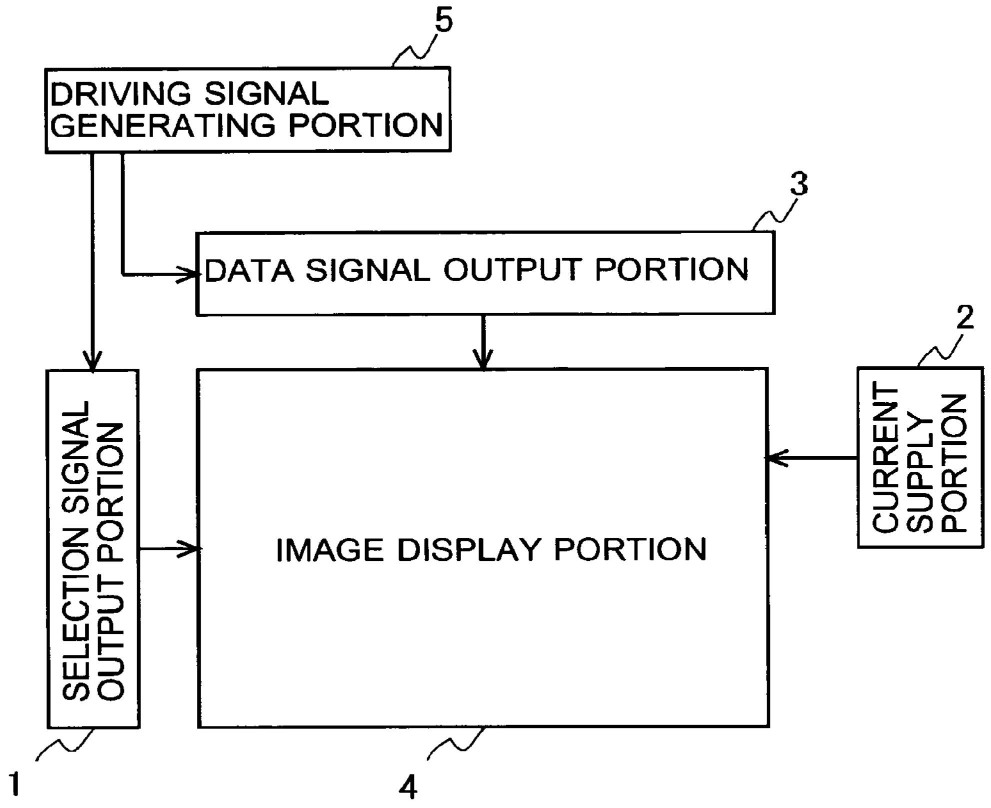
FIG. 1 is a block diagram showing the configuration of a display device according to an embodiment of the present invention.

FIG. 1 is a block diagram showing the configuration of a display device according to an embodiment of the present invention. This display device includes an image display portion 1, a current supply portion 2, a data signal output portion 3, a selection signal output portion 4, and a driving signal generating portion 5. The image display portion 1 is configured by arranging a plurality of display elements, each made of a circuit including an organic EL element serving as a light emitting element, in an m×n matrix. The selection signal output portion (gate driver circuit) 4 is connected to n scanning signal lines arranged in a row direction, and outputs a scanning signal having a predetermined period to the scanning signal lines. The data signal output portion (source driver circuit) 3 is connected to m data signal lines arranged in column direction, and outputs data signals for controlling emission and non-emission of the organic EL elements. The driving signal generating portion 5 outputs predetermined control signals for generating the scanning signals and the data signals to the selection signal output portion 4 and the data signal output portion 3. The current supply portion 2 is connected to a plurality of power source lines that are arranged in the column direction, and supplies a driving current for causing the organic elements to emit light.

Figure 2:
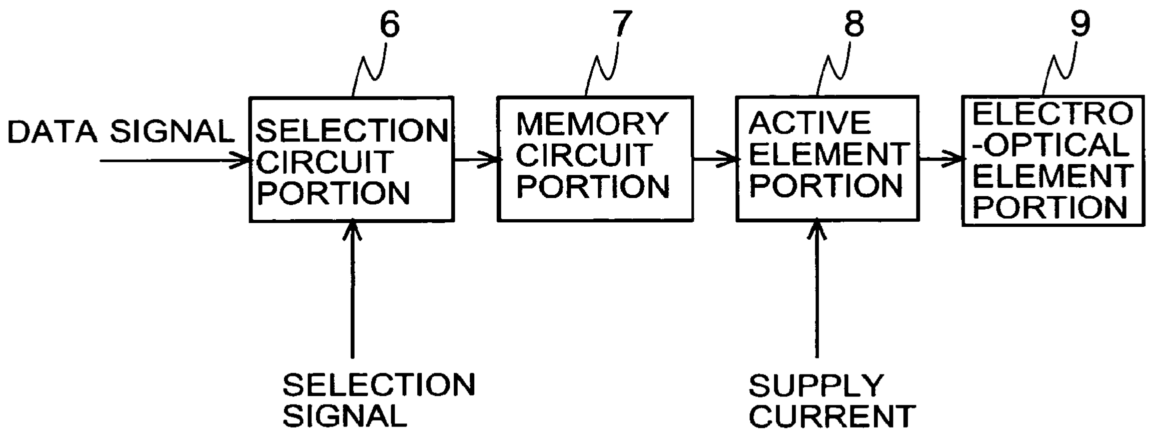
FIG. 2 is a block diagram showing the configuration of a display element according to an embodiment of the present invention.

FIG. 2 is a block diagram showing the configuration of a display element according to an embodiment of the present invention. The image display portion 1 is configured by arranging a plurality of such display elements in a matrix arrangement, as mentioned above. The display element includes a selection circuit portion 6 for receiving the data signal and the scanning signal, a memory circuit portion 7 for storing the data signal, an active element portion 8 for receiving a current from the current supply portion 2, and an electro-optical element portion 9. When the selection circuit portion 6 is selected by the scanning signal applied by the selection signal output portion 4, then the data signal applied by the data signal output portion 3 is stored in the memory circuit portion 7. The memory circuit portion 7 applies the stored data signal to the active element portion 8. The active element portion 8 applies a predetermined current to the electro-optical element portion 9 by controlling the current from the current supply portion 2 in accordance with the voltage of the data signal. The electro-optical element portion 9 emits light of a predetermined luminance by receiving the current from the current supply portion 2 whose current is controlled through the active element portion 8.

Figure 3:
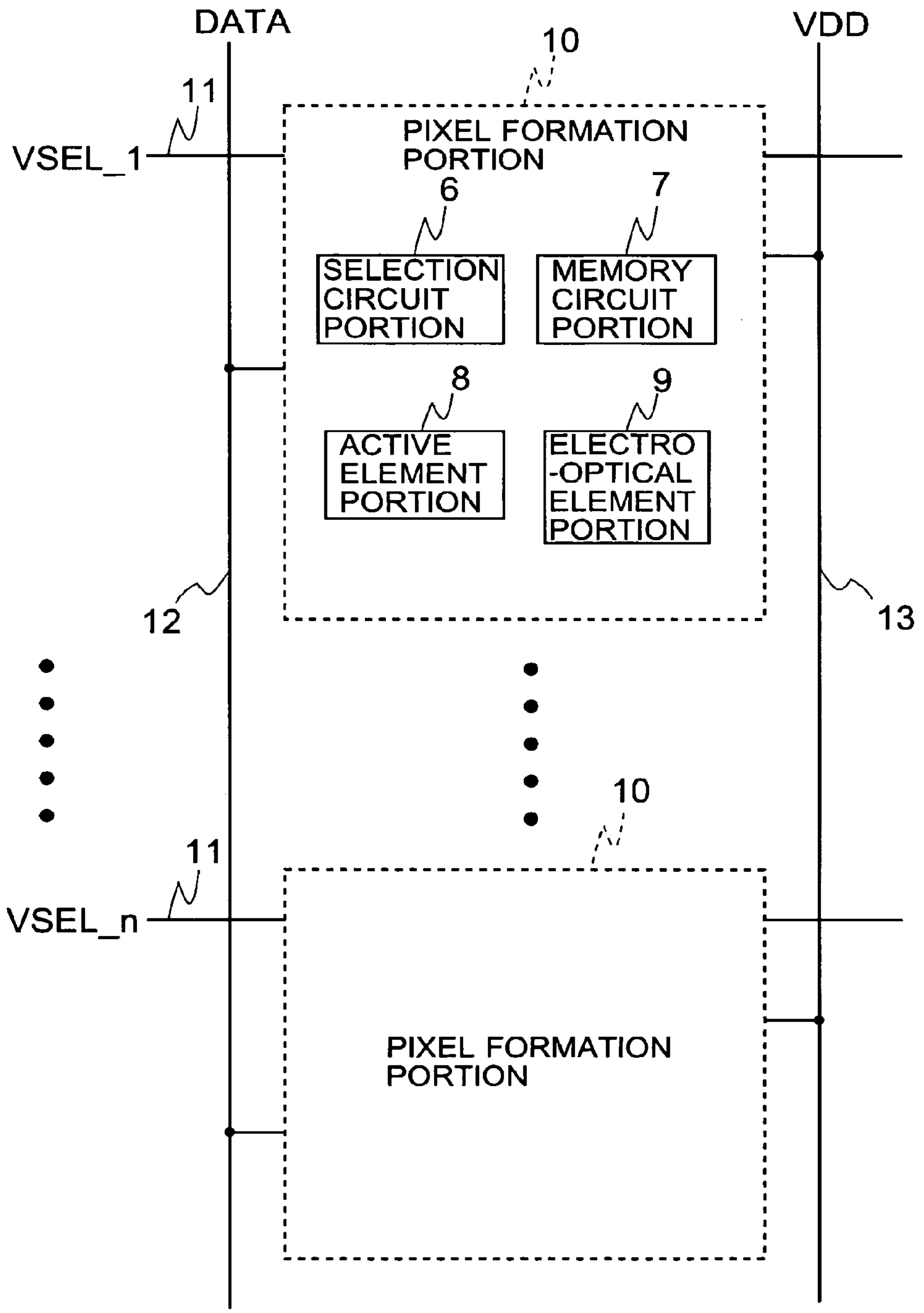
FIG. 3 is a diagrammatic view illustrating the positional relation between the pixel formation portions and the various conductors in an embodiment of the present invention.

FIG. 3 is a diagrammatic view illustrating the positional relation between the pixel formation portions forming the pixels and the various conductors. It should be noted that "pixel formation portion" refers to a region of the display element that does not include any conductors. FIG. 3 shows only a portion of a column with a plurality of pixel formation portions and the conductors associated therewith. More specifically, a data signal line 12 (data signal voltage DATA) and a power source line 13 (power source voltage VDD) are arranged parallel to one another in the column direction. Moreover, the n scanning signal lines 11 (scanning signal voltages VSEL_1 to VSEL_n) are arranged in a direction intersecting at right angles with the data signal lines 12 and the power source line 13. The pixel formation portions 10 are arranged in a region enclosed by these conductors. One pixel formation portion 10 corresponds to the display element shown in FIG. 2 and includes the selection circuit portion 6, the memory circuit portion 7, the active element portion 8, and the electro-optical element portion 9. In order to light the electro-optical element portion 9 at a predetermined luminance, a predetermined data signal voltage should be applied to the memory circuit portion 7.

Figure 4:
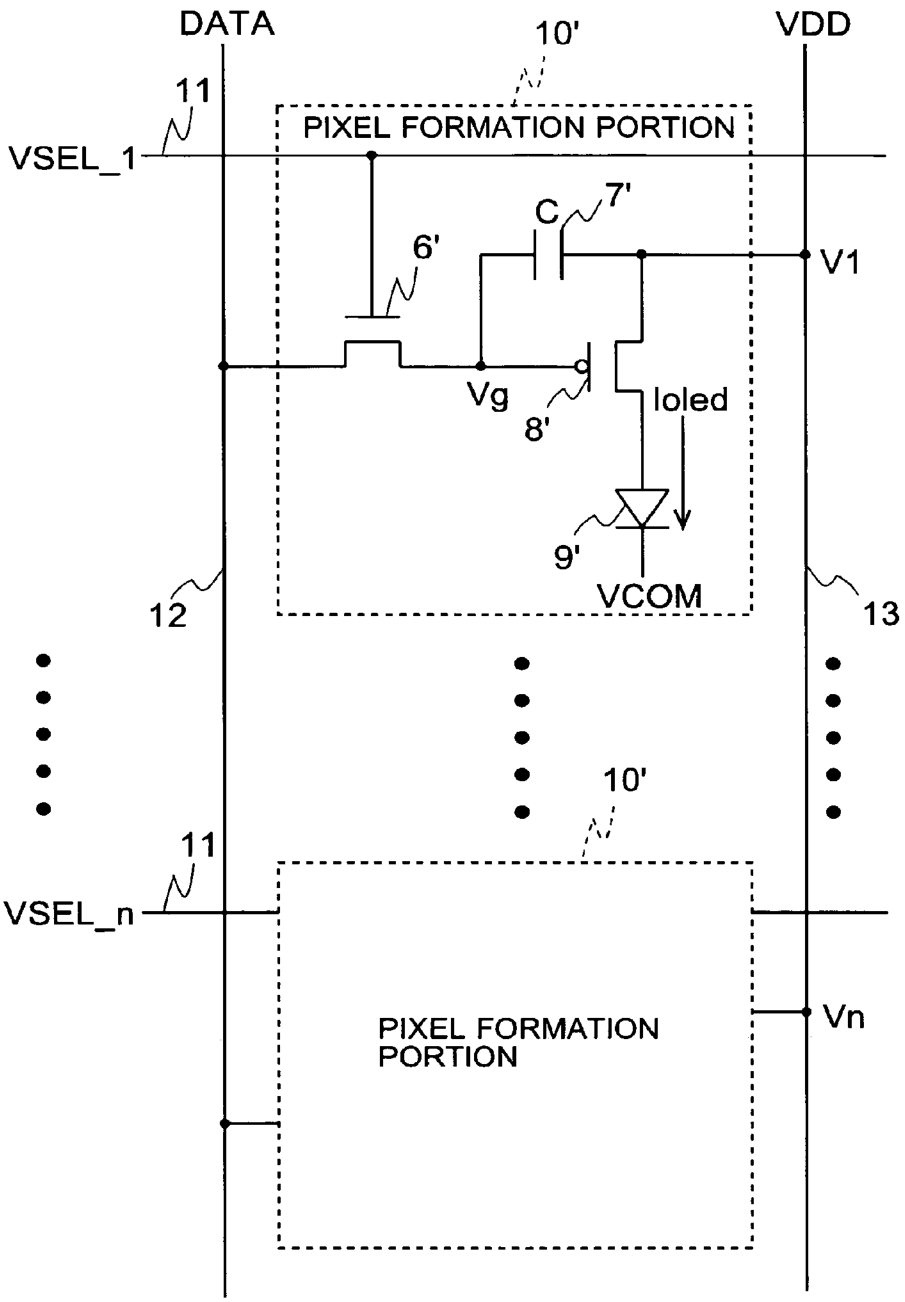
FIG. 4 shows an equivalent circuit of a display element according to an embodiment of the present invention.

FIG. 4 shows an equivalent circuit of a display element according to an embodiment of the present invention. This display element includes a pixel formation portion 10', and the various conductors shown in FIG. 3, that is, the scanning signal line 11, the data signal line 12 and the power source line 13. The pixel formation portion 10' includes an organic EL element 9' serving as the electro-optical element, an auxiliary capacitance 7', an organic EL control TFT 8', which is a p-channel TFT for controlling the current that is supposed to flow through the organic EL element 9', and a selection TFT 6', which is an n-channel TFT for controlling the timing at which the current flows through the organic EL element 9'. These elements correspond to the various structural elements shown in FIG. 3. That is to say, the selection TFT 6' shown in FIG. 4 corresponds to the selection circuit portion 6 shown in FIG. 3, the organic EL control TFT 8' corresponds to the active element portion 8, the auxiliary capacitance 7' corresponds to the memory circuit portion 7, and the organic EL element 9' corresponds to the electro-optical element portion 9.

As shown in FIG. 4, the power source line 13 is connected to the source terminal of the organic EL control TFT 8' and to one terminal of the auxiliary capacitance 7', whereas the other terminal of the auxiliary capacitance 7' is connected to the gate terminal of the organic EL control TFT 8' and to the drain terminal of the selection TFT 6'. Moreover, the source terminal of the selection control TFT 6' is connected to the data signal line 12, and the gate terminal of the selection control TFT 6' is connected to the scanning signal line 11. The anode of the organic EL element 9' is connected to the drain terminal of the organic EL control TFT 8', and the cathode of the organic EL element 9' is connected to a common electrode Vcom. It should be noted that in this display element, a p-channel TFT is used as the organic EL control TFT 8', but the display element may also have a pixel circuit configuration as known in the art, using an n-channel TFT. Moreover, for the sake of convenience, the pixel circuit shown in FIG. 4 has the simplest configuration for illustrating the operation of the present invention, but as long as the structural elements shown in FIG. 3 are included, the present invention can be similarly applied to a pixel circuit of any configuration.

In this display element, during the period in which the selection TFT 6' is selected by the scanning signal on the scanning signal line 11, a data signal voltage DATA is applied to the data signal line 12, so that a voltage corresponding to this data signal voltage is held by the auxiliary capacitance 7', and the organic EL control TFT 8' is controlled in accordance with the voltage held by the auxiliary capacitance 7' also in the subsequent period when the selection TFT 6' is not selected. Thus, the light emission amount is controlled by letting a predetermined current Ioled flow through the organic EL element 9' connected in series to the organic EL control TFT 8'.

Here, if the organic EL element 9' is lit up, the ON resistance of the control TFT 8' and the organic EL element 9', which are connected in series, becomes the load for the power source line 13. For example, if (the organic EL elements 9' of) all display elements arranged in one column of the display screen are lit up, then the current flowing through the power source line 13 is distributed among all display elements. In this case, with a circuit configuration using a p-channel TFT for the control TFT, the potential serving as a reference with which ON/OFF control is performed by the control TFT 8' in each of the display elements (referred to as "reference potential" below) becomes the reference potential V1, . . . , Vn, in order, starting with the one closest to the current supply portion 2 (power source voltage VDD), as shown in FIG. 4. The auxiliary capacitance 7' holds the potential difference between this reference potential and the gate potential Vg of the control TFT 8' (this held voltage is also referred to as "held voltage" in the following). The control TFT 8' performs current control in accordance with this held voltage.

If the values of all the reference potentials V1 to Vn would coincide, then there would be no variations of the luminance of the lit pixels arranged in the column direction. However in practice, the current Ioled flowing through each of the organic EL elements 9' from the current source 13 is subject to a distribution, so that the reference potentials V1 to Vn applied to the display elements differ due to the voltage drop caused by the resistance, and a variation occurs in the reference potentials V1 to Vn. Consequently, even when the gate potential Vg in the display elements is the same, the voltage applied to (i.e. between gate and source of) the control TFT 8' varies, that is the held voltage varies, so that also the current that flows varies. As a result, the current Ioled flowing through the organic EL element 9' varies with a predetermined distribution.

Figure 5:
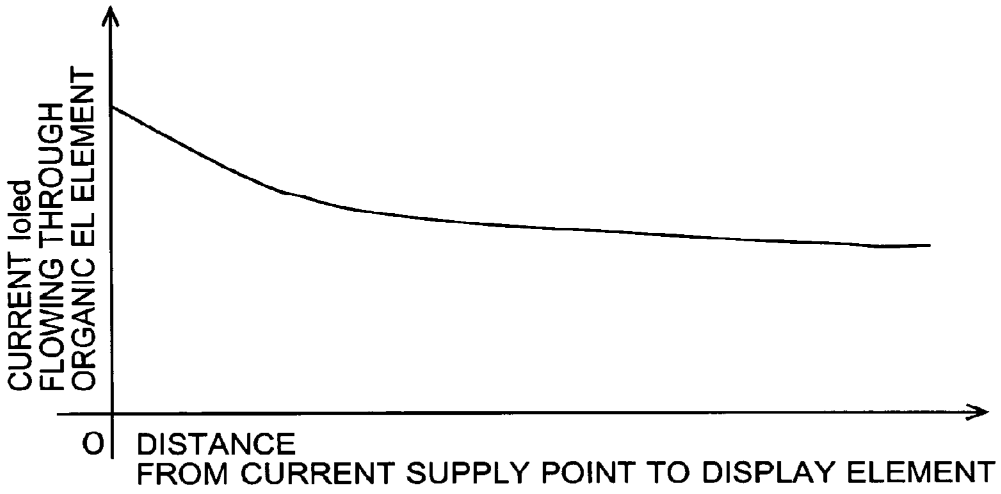
FIG. 5 is a graph showing the relation between the current flowing through an organic EL element according to an embodiment of the present invention and the distance from a current supply point of the current supply portion for the power source line to the display element.

FIG. 5 is a graph showing the relation between the current Ioled flowing through the organic EL elements 9' of the display elements and the distance between a current supply point of the current supply portion 2 and the respective display element. It should be noted that the "current supply point" is a point on the power source line 13 and refers to the point where the power source line 13 is connected to the current supply portion 2, and that it is assumed that there is no voltage drop at this point. As shown in FIG. 5, the value of the current Ioled at neighboring display elements is substantially the same, but the value of the current Ioled at display elements that are far apart is very different. Since there is a substantially linear relation between the current Ioled flowing through the organic EL elements and their luminance, variations in current correspond to variations in luminance. Consequently, when the configuration of the display device is such that the current is applied to the display elements from the top of the display screen of the display device, that is, if the current supply point is only at the top of the screen, then, when the entire screen is lit up, the display screen has the highest luminance at its upper portion and the luminance decreases over the middle portion to the bottom portion, where the luminance is lowest.

Figure 6:
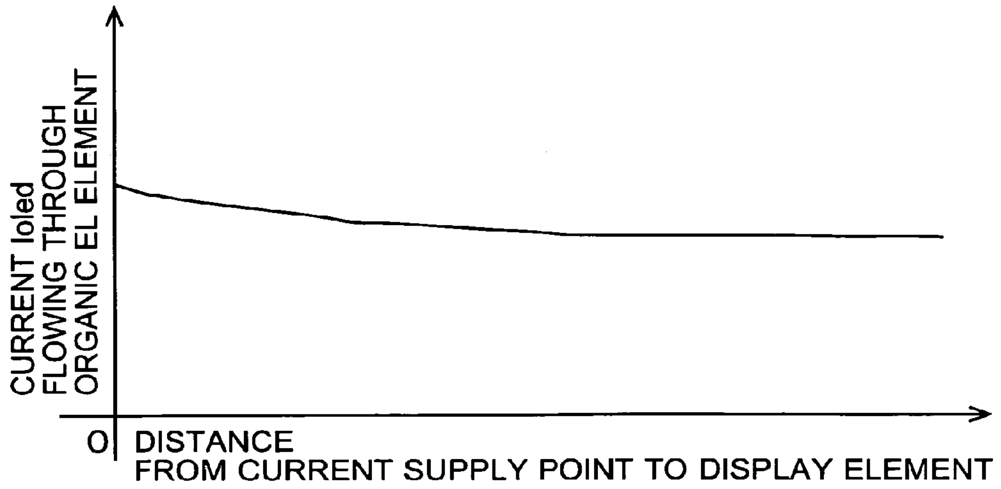
FIG. 6 is a graph showing the relation between the current flowing through the organic EL elements of the display elements and the distance from the current supply point to the display element, when the resistance of the power source line according to an embodiment of the present invention is made smaller.

Here, the lower the resistance of the power source line 13 is, the smaller is the voltage drop between display elements, so that if the resistance of the power source line 13 is made smaller than shown in FIG. 5, also the change of the current Ioled flowing through the organic EL elements 9' can be made smaller. FIG. 6 is a graph showing the relation between the current Ioled flowing through the organic EL elements 9' of the display elements and the distance between the current supply point and the respective display element, when the resistance of the power source line 13 is made smaller than in the configuration illustrated in FIG. 5. A comparison between FIGS. 5 and 6 shows that the larger the resistance of the power source line 13 is, the larger is the change of the current Ioled, as shown in FIG. 5, that is, the larger is the difference between the largest current value and the smallest current value, and also the lowest current value itself becomes smaller. Consequently, in the most extreme case, when all display elements of the display screen are controlled to be lit up, the display elements closest to the current supply point are lit up by a large current Ioled, the current Ioled decreases sharply with increasing distance from the current supply point, and at the display element furthest away, the current Ioled becomes too small, so that there is the risk that the current Ioled falls into the non-lighting region and the display element is not lit up, even though it is controlled to be lit up.

As explained above, it is preferable that the resistance of the power source line 13 is reduced in order to reduce the variation of the current Ioled, but since in practice it is impossible to make the resistance of the power source line 13 substantially zero, it is necessary to provide a limit (referred to as "tolerance value" below) that can be realized in practice and with which the variation can be made as small as possible. Regarding this tolerance value, it is possible to refer to the tolerance value for luminance change in display screens of liquid crystal displays (referred to as "LCDs" below). Ordinarily, the human eye cannot perceive any differences when the luminance changes in the display screen of completely lit LCDs do not exceed a level of 2 %/cm, and this value is taken as the target for the tolerance value. In LCDs, the luminance distribution of the backlight serving as the light emitting portion directly affects the display luminance, so that measures are taken to ensure that the luminance of the backlight is at levels within this tolerance value. The following is an explanation of a display device (and display element) in which, while referring to this tolerance value, the tolerance value for the variation of the current Ioled (referred to as "current variation tolerance value" or simply "tolerance value" in the following) is set to X % and the variation of the current Ioled is kept within the range of this tolerance value.

It should be noted that since the organic EL element emits light at a luminance corresponding to the current Ioled, the distribution of the current Ioled, which depends on the distance from the current supply point as shown in FIG. 5, that is, the distribution of the emitted luminance, is naturally different from that of an LCD. Conceivable methods for suppressing variations in the current Ioled in the present display device are the method of adjusting the voltage level (or current level) of the data signal and the method of adjusting the resistance of the power source line. Here, an approach is described in which the variations of the current Ioled are suppressed to within the tolerance value by adjusting the resistance of the power source line.

Figure 7:
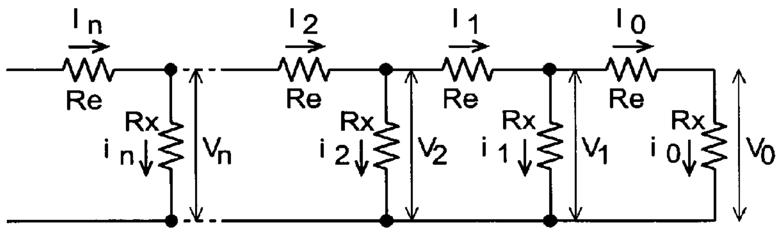
FIG. 7 shows an equivalent circuit in which the power source line in an embodiment of the present invention and the pixel formation portions connected thereto are expressed as resistors.

FIG. 7 shows an equivalent circuit in which the power source line 13 and the pixel formation portions 10' connected thereto, as shown in FIG. 4, are represented by resistors. The common electrode VCOM in the pixel formation portions 10' is configured by an extremely large electrode. Thus, its resistance can be regarded as much smaller than that of the power source line 13, so that its resistance can be ignored here. Moreover, the power source line 13 is made of resistance elements corresponding in number to the display elements, each of the resistance elements having a resistance of the value Re. Assuming that the control TFT 8' and the organic EL element 9' are controlled to the lit-up state, they are modeled as a resistance element having the combined resistance Rx of the control TFT 8' and the organic EL element 9'. Furthermore, in the equations described below, it is assumed that the control TFT 8' is operated in a state in which the drain current is saturated with respect to the gate-source voltage Vgs (that is, in the ON state in which Vgs>>Vth), and the TFT 8' has a constant resistance that is independent of the values for the reference potential and the gate potential Vg. Moreover, assuming that the current-voltage characteristics near the lighting conditions for lighting at a predetermined luminance are linear, the resistance of the organic EL element 9' when lit is taken to be constant. That is to say, the resistance element having the combined resistance Rx is assumed to have a constant value in the region of the lighting conditions.

To keep the calculations simple, it is further assumed that the voltage VCOM of the common electrode is VCOM=0. Furthermore, $V_0$ denotes the voltage applied to the display element that is furthest away from the current supply point of the current supply portion 2, that is, the voltage at the point where that display element is connected to the power source line 13. And $i_0$ denotes the current flowing from that connection point to the organic EL element 9'. The pixel formation portion corresponding to this connection point is also referred to as "node 0". Taking this node 0 as the starting point for the following calculation, when the current $i_n$ and the voltage $V_n$ at the node n, which corresponds to the n-th display element, are calculated in order toward the current supply point, then the current and the voltage at each node can be expressed by the following recursive equations:

$$i_0=V_0/Rx$$

$$I_0=i_0$$

$$V_1=I_0\cdot(Re+Rx)$$

$$i_1=V_1/Rx$$

$$I_1=i_1+I_0$$

$$V_2=I_1\cdot Re+V_1$$

$$i_{n-1}=V_{n-1}/Rx$$

$$I_{n-1}=i_{n-1}+I_{n-2}$$

$$V_n=I_{n-1}\cdot Re+V_{n-1}$$

$$i_n=V_n/Rx$$

$$I_n=i_n+I_{n-1}$$

$$VDD=I_n\cdot Re+V_n$$

Here, the maximum fluctuation rate Δi of the currents $i_o$ to in $i_n$ accordance with the current distribution of the currents $i_o$ to $i_n$ across all nodes can be expressed by the following Expression (1), taking the average value (intermediate value) of the maximum current and the minimum current in the current distribution as a reference:

$$\Delta i=2(i_n-i_0)/(i_n+i_0)\times 100\% \quad (1)$$

For example, when the maximum fluctuation rate Δi as given by Expression (2) is 200% (that is, when there is a fluctuation of ±100% around the average value), then this means that the current $i_n$ at the node n is twice the average value, and that the current $I_n$ at the node 0 is 0. However, in this case, a portion of the display elements is not properly lit up, so that the display device can be said to be defective.

Referring again to FIG. 5, it can be seen that the location with the largest differences in the current applied to two neighboring display elements is the location where the curve in FIG. 5 has the largest slope, that is, the location closest to the current supply point. At this position in the equivalent circuit in FIG. 7, the node n is located, which is closest to the terminal for the current voltage VDD. Moreover, the difference in the current values becomes smaller for smaller node numbers. This shows that the variation of the current Ioled is within the tolerance range, if the difference between the current of the node n, through which the largest current flows, and the current through the node with the node number at a position that (in actual scale) is 1 cm removed from this node n on the display screen of the display device is not greater than the tolerance value of X %. The resistance Re of the power source line 13 for each display element should be set such that the maximum fluctuation rate stays within this tolerance range. If the maximum fluctuation rate $\Delta i_n$ in the range having the node n as the starting point and the node of the pixel that is closest to a position 1 cm removed from the node n as the end point is expressed as an inequality, then it can be expressed by the following Expression (2), which is derived from Expression (1):

$$\Delta i_n = 2(i_n - i_{n-1cm})/(i_n + i_{n+1cm}) \times 100\% \leqq X\ \% \quad (2)$$

Here, the subscript "n−1 cm" of i in Expression (2) signifies the node number of the pixel that is closest to the position 1 cm removed from the node n.

For example, when the display screen of the display device has a pixel resolution of 100 PPI (pixels per inch) and has 176×RGB×220 pixels as used for example in mobile phones, then two pixels that are separated by 1 cm on the display screen are spaced apart by 39 pixels.

Figure 8:
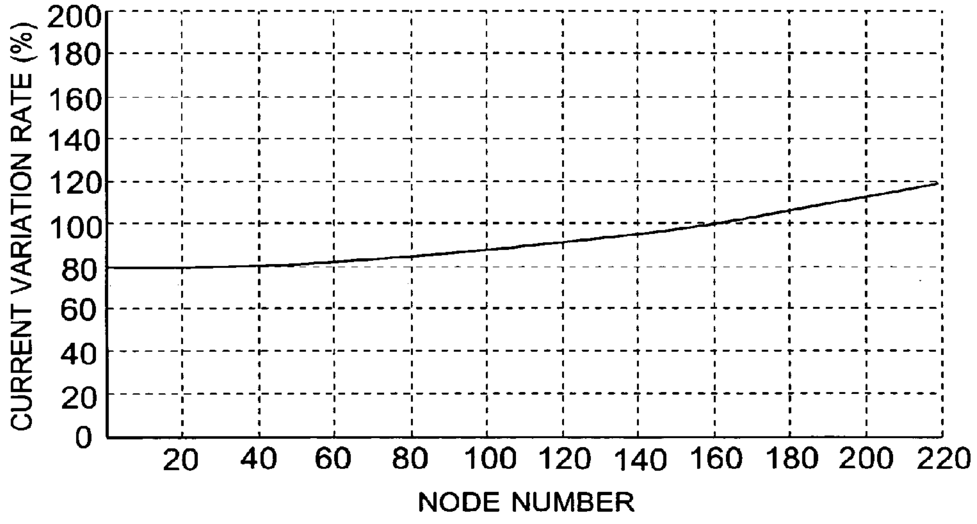
FIG. 8 is a graph showing the variation of the current at each of the nodes of a display device according to an embodiment of the present invention.
Figure 9:
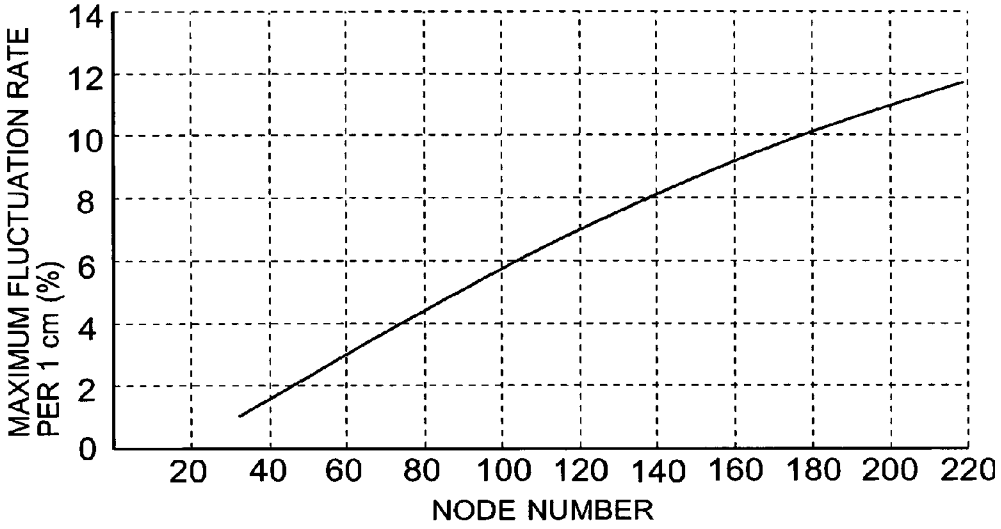
FIG. 9 is a graph showing the maximum fluctuation rate at each node in a display device according to an embodiment of the present invention.

FIG. 8 is a graph showing the variation of the current Ioled at each of the nodes of the display device with the above configuration. Here, the proportion of the variation of the current Ioled at each of the nodes (referred to below as "current variation rate" is the proportion when the average value of the maximum and the minimum of the current distribution for all nodes is taken as 100%. The current variation rate shown in FIG. 8 has a distribution of ±20% from the average value. FIG. 9 is a graph showing the node numbers k in the display device and the maximum fluctuation rate $\Delta i_k$ of the nodes removed by 1 cm from those nodes. This maximum fluctuation rate $\Delta i_k$ is obtained by substituting n in Expression (2) with the pixel number k of any column (where k is an integer from 0 to n−1). It should be noted that here, n=220.

Referring to FIGS. 8 and 9, it can be seen that the node where the current Ioled is greatest and the node where the maximum fluctuation rate $\Delta i_k$ indicating the current variation per 1 cm is greatest are both the node 219. Moreover, it can be seen that the maximum fluctuation rate $\Delta i_k$ of the current Ioled from the nodes near the node 50 to the node 219 is much larger than 2%/cm (X=2%), which is the above-noted tolerance value for LCDs. Consequently, it can be said that the display quality of this display device is insufficient.

When the equation for the voltage $V_k$ in the above-mentioned recursive equations is calculated for k's in the range of $2 \leqq k \leqq n$, then $V_k$ can be expressed as:

$$V_k = ((Re/Rx)+2) \cdot V_{k-1} - V_{k-2}$$

Moreover, for k=1, $V_1$ can be expressed as:

$$V_1 = ((Re/Rx)+1) \cdot V_0$$

It should be noted that $i_k = V_k/Rx$.

From the above, if the resistance ratio of Rx/Re is given, the maximum fluctuation rate $\Delta i_n$ defined by Expression (2) can be determined, so that the range of resistance ratios Rx/Re within the predetermined tolerance range of X % can be determined through a predetermined numerical calculation. Thus, when the display device uses the above-described display screen, namely a display screen whose pixel resolution is 100 PPI and whose number of pixels is 176×RGB×220, then the condition for the resistances Re and Rx at which the condition of Expression (2), which is based on the afore-mentioned recursive equations, is true, can be determined by a numerical calculation to be $Rx/Re \geqq 3.77 \times 10^5$.

Moreover, in this display screen, only one current supply point is provided for the power source line leading to a group of display elements of one column, but variations in the current Ioled can be suppressed by providing current supply points at both ends (upper end and lower end) of the power source line linked to the display element group of one column (referred to as "display element column" in the following). Therefore, it is possible to relax the condition for the resistance ratio Rx/Re, that is, to make the lower limit thereof smaller. The above-mentioned variation in the case that current is supplied from both ends of the display element column can be regarded as the variation when current is supplied only from one side but the number of nodes is cut in half. Consequently, if the above-described display screen is used and current is supplied from both ends of the display element columns, then the number of nodes for the calculation can be taken to be 110, which is half of the actual number of nodes 220. That is to say, the calculation can be made for the case that in the recursive equations and in Expression (2), n is 109. In this case, the condition for the resistances Re and Rx at which the condition of Expression (2), which is based on the afore-mentioned recursive equations, is true can be calculated by the same numerical calculation to be $Rx/Re \geqq 1.73 \times 10^5$.

It should be noted that since this way of calculating the resistance (resistance ratio) can be easily applied in accordance with the number and location of the current supply points, it is possible to apply it to display devices having any number of display pixels and any pixel resolution.

Figure 10:
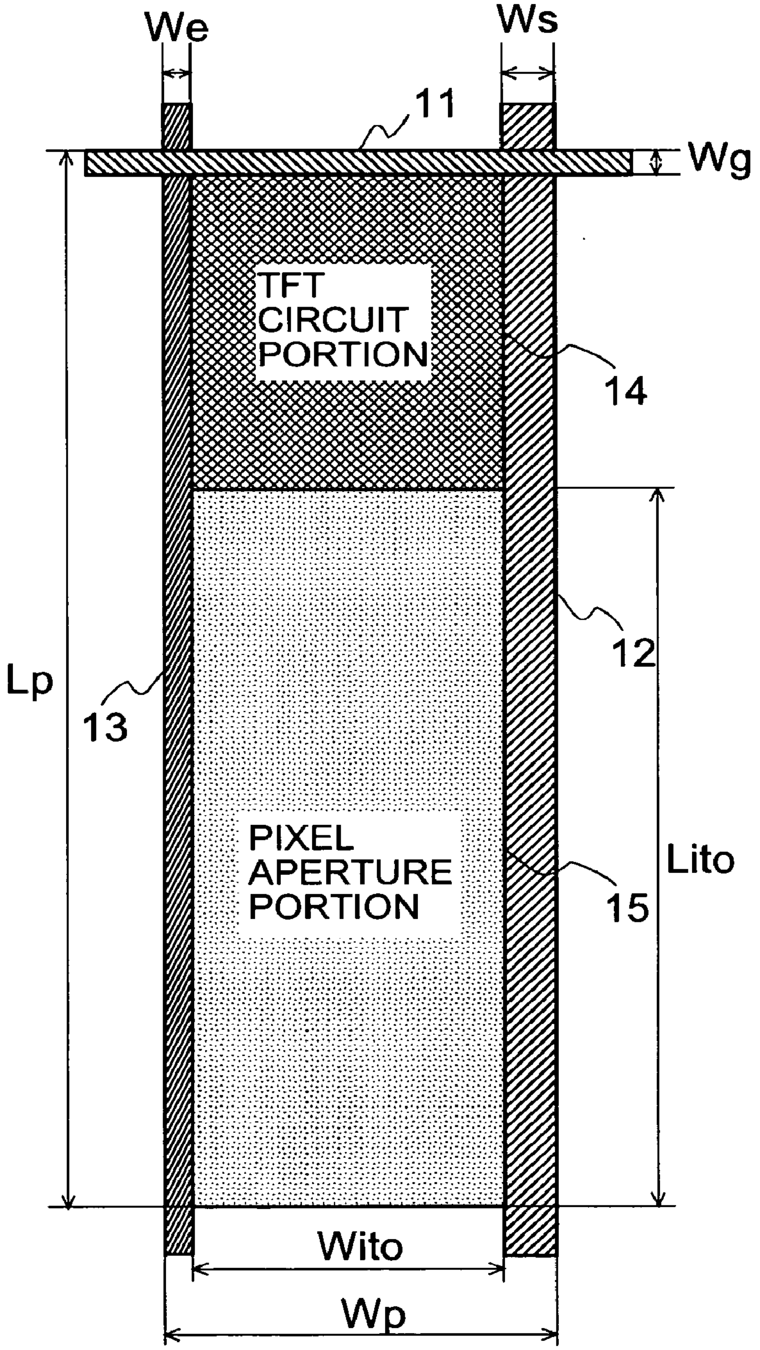
FIG. 10 is a top view showing an outline of the structure of a display element according to an embodiment of the present invention.

The following is a description of a configuration for disposing the electrode of the power source line having the above-noted resistance ratio in an appropriate manner within the display elements. FIG. 10 is a top view schematically showing the structure of a display element. This display element is rectangular with a width Wp and a length Lp, and includes a scanning signal line electrode 11, a data signal line electrode 12, a power source line electrode 13, a TFT circuit portion 14, and a pixel aperture portion 15. The scanning signal line electrode 11, whose width is Wg, is disposed along one side (one of the short sides) of this pixel element. The data signal line 12, whose width is Ws, and the power source line electrode 13, whose width is We, are respectively arranged along two sides (the two long sides) of the display element in a direction intersecting at right angles with the scanning signal line electrode 11. Moreover, the TFT circuit portion 14 is disposed in a predetermined region enclosed by these electrodes, and the pixel aperture portion 15, whose width is Wito and whose length is Lito, is disposed in the remaining region. An organic EL element material serving as the electro-optical element material is applied to this pixel aperture portion 15. The emitted light amount of this pixel aperture portion 15 is controlled in accordance with the amount of current received from the TFT circuit portion 14.

Here, the widths Wg, Ws and We of the scanning signal line electrode 11, the data signal line electrode 12, and the power source line electrode 13 can be set as appropriate and are ordinarily designed to values satisfying the operation characteristics of the overall display element. For example, the scanning signal line electrode 11 and the data signal line electrode 12 are set to such electrode widths that the waveform is not noticeably contorted at any position in the display screen and a sufficient pulse can be attained during the selection period. In contrast to these electrodes, the temporal variation ratio of the voltage applied to the power source line electrode 13 is small, because basically a direct current is applied to the power source line electrode 13. However, this power source line electrode 13 applies the current to the organic EL element included in the pixel aperture portion 15 via the TFT circuit portion 14, so that there is a voltage distribution that is subject to the voltage drop at each of the display elements. For example, when the width We of the power source line electrode 13 is comparatively small, then the voltage drop between the display elements becomes large, because the electrode resistance per display element becomes relatively large. Therefore, a comparatively large difference in the supply currents occurs between neighboring display elements in the direction in which the power source line electrode 13 is laid out (that is, the column direction). Conversely, when the width We of the power source line electrode 13 is comparatively large, then the difference in the supply currents between neighboring display elements becomes small, because the resistance of the power source line electrode 13 becomes relatively small. Thus, it can be seen that the electrode resistance Re of the power source line 13 is determined depending on the width of each of the electrodes in the display element shown in FIG. 10.

The following is a description of the pixel aperture portion 15. As mentioned before, making the electrode resistance Re of the power source line 13 larger means making the electrode width We smaller. This means that the region to be occupied by the TFT circuit portion 14 and the pixel aperture portion 15 covers a relatively wide surface area. Conversely, to make the electrode resistance Re small, it becomes necessary to make the electrode width We large, so that the region to be occupied by the TFT circuit portion 14 and the pixel aperture portion 15 becomes relatively small. Ordinarily, it is not necessarily easy to change the surface area covered by the TFT circuit portion 14 freely in accordance with the size of the electrode width We. For this reason, if this surface area is regarded as a fixed surface area, then making the electrode resistance Re small means ultimately reducing the surface area of the pixel aperture portion 15.

Figure 11:
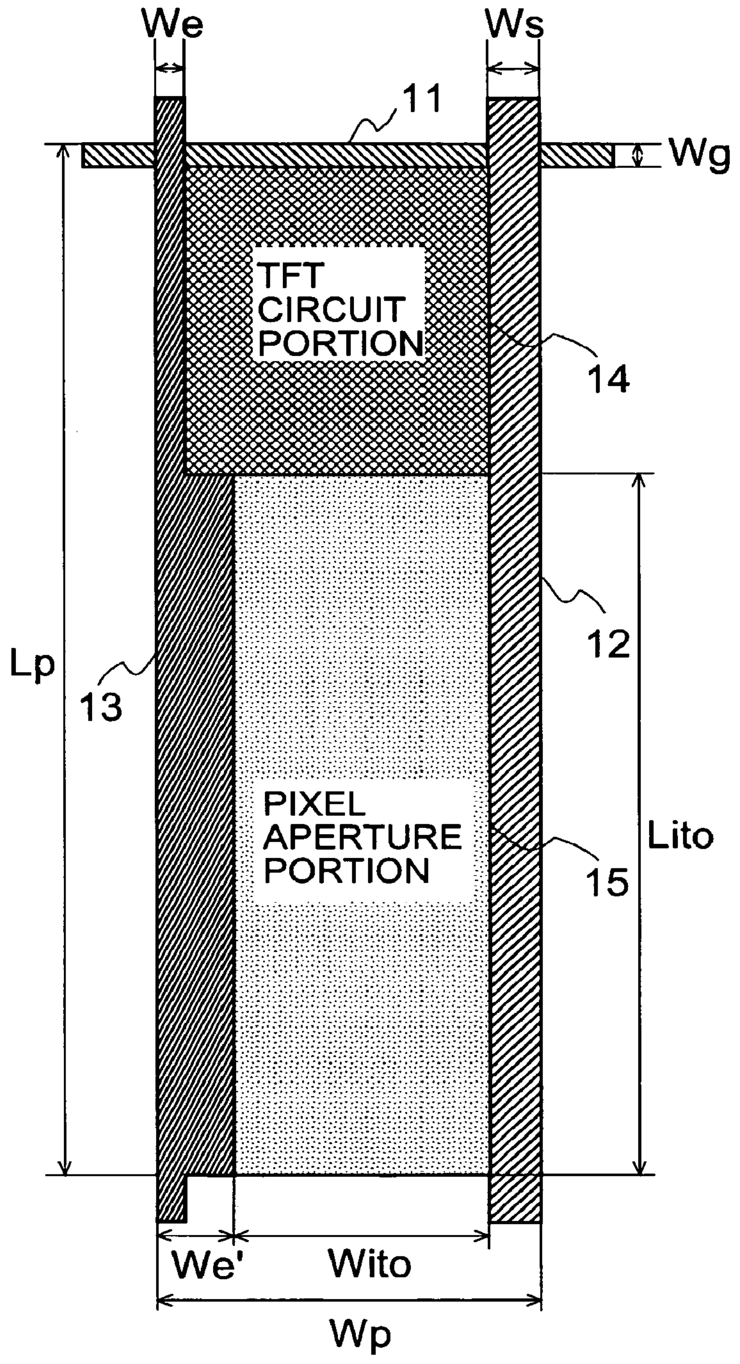
FIG. 11 is a top view schematically showing an example of a structure of a display element according to an embodiment of the present invention, in which the electrode width has been enlarged.

FIG. 11 is a top view schematically showing an example of a structure of a display element in which the electrode width has been partially enlarged. As shown in FIG. 11, the power source line electrode 13 is configured such that the electrode width We' of the portion contacting the pixel aperture portion 15 is made larger than the electrode width We of the other portions, because as mentioned above, it is not necessarily easy to change the surface area covered by the TFT circuit portion 14 freely in accordance with the size of the electrode width We. With this configuration, the electrode resistance Re can be reduced. Of course, there is the downside that this reduces the surface area ratio of the pixel aperture portion 15 to the overall display element (referred to as "numerical aperture" below).

It should be noted that in order to keep the influence of the electrode deterioration due to electromigration and the like to a minimum, it is preferable that ideally, the electrode width We of the power source line electrode 13 is uniform along the direction in which the electrode is laid out, but making the electrode width non-uniform does not cause any major problems. Moreover, the power source line electrode 13 may also have more than two electrode widths or the electrode width may be changed continuously, and there is no particular limitation to the shape of the power source line electrode 13.

Here, in order to set the luminance of the display screen to a predetermined value, an emitted luminance in accordance with the surface area of the pixel aperture portion 15 is necessary, so that a relatively large emitted luminance is required as the numerical aperture becomes smaller. For example, in electro-optical elements such as organic EL elements or LEDs, also the current flowing through the electro-optical element increases as the emitted luminance becomes large.

Figure 12:
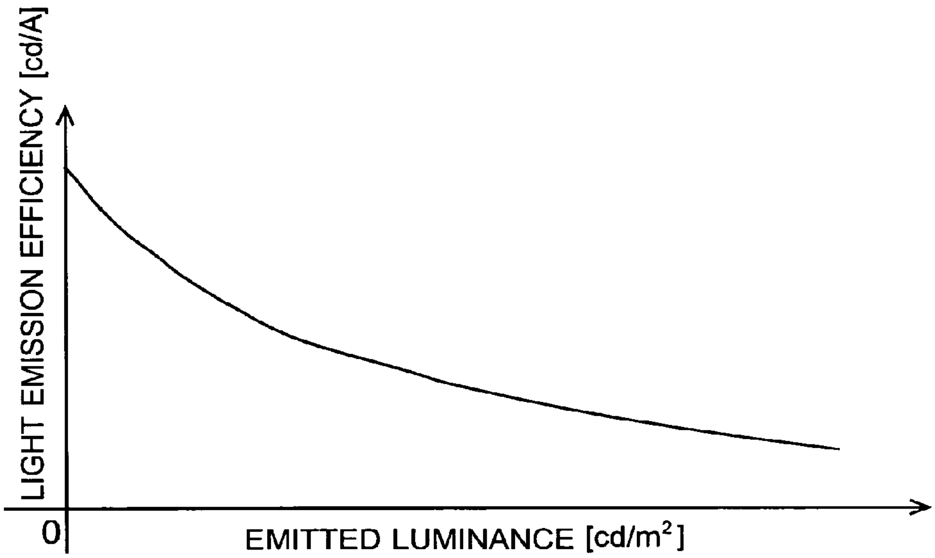
FIG. 12 is a graph showing the relation between the light emission efficiency and the emitted luminance of an electro-optical element in an embodiment of the present invention.

FIG. 12 is a graph showing the relation between the light emission efficiency and the emitted luminance of the electro-optical element. As shown in FIG. 12, the light emission efficiency, which is the emitted luminance per unit current, has the tendency to decrease as the emitted luminance becomes large. Consequently, it can be seen that, as mentioned above, the smaller the resistance Re of the power source line electrode 13 is made, the more is the numerical aperture decreased, so that eventually, also the light emission efficiency becomes small. Thus, the lifetime of the display element can be prolonged and the power consumption can be kept low when the light emission efficiency is set high by setting the numerical aperture of the pixels as high as possible.

Thus, the size (width) of the power source line electrode 13 that is minimally necessary in order to suppress variations of the luminance within the display screen can be decided by determining the ratio between the electrode resistance Re of the power source line 13 and the combined resistance Rx of the control TFT 8' and the organic EL element 9' when the organic EL element 9' is lit, such that the condition given by Expression (2) is satisfied. That is to say, if the electrode surface area of the power source line electrode 13 is set such that the numerical aperture becomes largest in accordance with the value of the thus obtained electrode resistance Re, then the luminance variation within the display screen can be suppressed and a display device and display element allowing display with a favorable light emission efficiency can be realized.

It should be noted that the tolerance value X of the luminance variation within the display screen of this display device was set to X=2% in view of the luminance variation tolerance per unit length that is ordinarily used for LCDs, but there is no limitation to this value, and it is also possible to change this value to a value (such as 5%, 8% or 10%) that is appropriate with regard to the display characteristics of the display element.

Moreover, if, in addition to this approach, the conventional approach of equalizing luminance variations by correcting the voltage (or current) of the data signal is used, then it is possible to enhance the above-described advantageous effect. However, this requires special circuitry for correcting the data signals, so that it is not preferable with regard to the increase of the scale of the overall circuitry.

Based on the foregoing, the following are commented examples of calculations of the minimally required resistance ratio Rx/Re and the resistance Re when setting the tolerance value X for current variation per unit length to 2%, 5% 8% and 10%. Numerical values are given for various pixel resolutions of the display screen of the display apparatus according to this embodiment, numbers of pixels in column direction (referred to as "column pixel number" in the following), numbers of current supply points, and combined resistances Rx.

FIRST CALCULATION EXAMPLE

As a first calculation example, the resistance ratio Rx/Re is calculated from the above-noted recursive equations as well as Expression (2) for the case that the pixel resolution and the pixel number in column direction of the display screen of the display device are set to various values. The results are listed in Table 1 below. It should be noted that the current flowing through the current line 13 is supplied from one point on one side (the upper side) for each display element column.

TABLE 1

| Resolution | Column Pixel | Rx/Re at Tolerance Value | | | |
|---|---|---|---|---|---|
| PPI | Number N | 2% | 5% | 8% | 10% |
| 100 | 176 | 2.96E+05 | 1.14E+05 | 6.80E+04 | 5.28E+04 |
| 120 | 176 | 3.49E+05 | 1.35E+05 | 8.15E+04 | 6.37E+04 |
| 150 | 176 | 4.23E+05 | 1.65E+05 | 1.00E+05 | 7.88E+04 |
| 170 | 176 | 4.69E+05 | 1.83E+05 | 1.12E+05 | 8.81E+04 |
| 200 | 176 | 5.31E+05 | 2.08E+05 | 1.28E+05 | 1.01E+05 |
| 100 | 220 | 3.77E+05 | 1.43E+05 | 8.44E+04 | 6.50E+04 |
| 120 | 220 | 4.48E+05 | 1.71E+05 | 1.02E+05 | 7.95E+04 |
| 150 | 220 | 5.48E+05 | 2.12E+05 | 1.28E+05 | 1.00E+05 |
| 170 | 220 | 6.11E+05 | 2.37E+05 | 1.44E+05 | 1.13E+05 |
| 200 | 220 | 7.00E+05 | 2.73E+05 | 1.67E+05 | 1.31E+05 |
| 100 | 480 | 8.28E+05 | 2.91E+05 | 1.59E+05 | 1.16E+05 |
| 120 | 480 | 1.00E+06 | 3.62E+05 | 2.03E+05 | 1.50E+05 |
| 150 | 480 | 1.26E+06 | 4.65E+05 | 2.67E+05 | 2.02E+05 |
| 170 | 480 | 1.43E+06 | 5.33E+05 | 3.09E+05 | 2.35E+05 |
| 200 | 480 | 1.67E+06 | 6.31E+05 | 3.71E+05 | 2.85E+05 |
| 100 | 600 | 1.02E+06 | 3.47E+05 | 1.82E+05 | 1.29E+05 |
| 120 | 600 | 1.24E+06 | 4.36E+05 | 2.37E+05 | 1.72E+05 |
| 150 | 600 | 1.57E+06 | 5.68E+05 | 3.18E+05 | 2.36E+05 |
| 170 | 600 | 1.79E+06 | 6.55E+05 | 3.72E+05 | 2.79E+05 |
| 200 | 600 | 2.11E+06 | 7.82E+05 | 4.52E+05 | 3.43E+05 |
| 100 | 768 | 1.28E+06 | 4.12E+05 | 2.05E+05 | 1.41E+05 |
| 120 | 768 | 1.57E+06 | 5.26E+05 | 2.73E+05 | 1.93E+05 |
| 150 | 768 | 2.00E+06 | 6.98E+05 | 3.78E+05 | 2.74E+05 |
| 170 | 768 | 2.28E+06 | 8.11E+05 | 4.48E+05 | 3.29E+05 |
| 200 | 768 | 2.70E+06 | 9.79E+05 | 5.52E+05 | 4.11E+05 |
| 100 | 1080 | 1.71E+06 | 4.98E+05 | 2.27E+05 | 1.49E+05 |
| 120 | 1080 | 2.12E+06 | 6.57E+05 | 3.14E+05 | 2.12E+05 |
| 150 | 1080 | 2.74E+06 | 8.98E+05 | 4.55E+05 | 3.16E+05 |
| 170 | 1080 | 3.15E+06 | 1.06E+06 | 5.51E+05 | 3.89E+05 |
| 200 | 1080 | 3.75E+06 | 1.30E+06 | 6.98E+05 | 5.03E+05 |

It can be seen from Table 1 that the higher the pixel resolution for the same column pixel number is, the larger is the minimally necessary resistance ratio Rx/Re for the same current variation tolerance value. For example, if the display screen of the display device is a VGA screen (of 640×RGB×480 pixels) with a pixel resolution of 100 PPI, then the column pixel number is 480. It can be seen that in this case, Rx/Re should be set to $Rx/Re \geqq 8.28\times10^5$ in order to keep the current variation (in other words the luminance variation) in the column direction within 2%. Furthermore, if a display device in which there are no large problems regarding variations of the display luminance is provided with a large current variation tolerance value, then the resistance ratio Rx/Re becomes smaller, so that the resistance ratio Rx/Re, that is, the electrode resistance Re of the power source line 13 can be determined with less strict conditions. For example, referring to Table 1, in a display device having a display screen with the same pixel resolution and column pixel number as above, when the current variation tolerance value is set to 10%, then it is sufficient to set Rx/Re to $Rx/Re \geqq 1.16\times10^5$. It can be further seen from Table 1 that when the current variation tolerance is set to 8% or to 10%, then the current variation can be kept within the tolerance range for display devices having a comparatively low pixel resolution and a comparatively small column pixel number, even when Rx/Re is set to $Rx/Re \geqq 1\times10^5$. Furthermore, it can be seen that when Rx/Re is set to $Rx/Re \geqq 1\times10^6$, and the current variation tolerance value is set to 5% to 10%, then the current variation is kept within the tolerance range for almost all display devices, and also when the current variation tolerance is set to 2%, the current variation can be kept within the tolerance range for display devices with a display screen having a comparatively small column pixel number.

SECOND CALCULATION EXAMPLE

Figure 13:
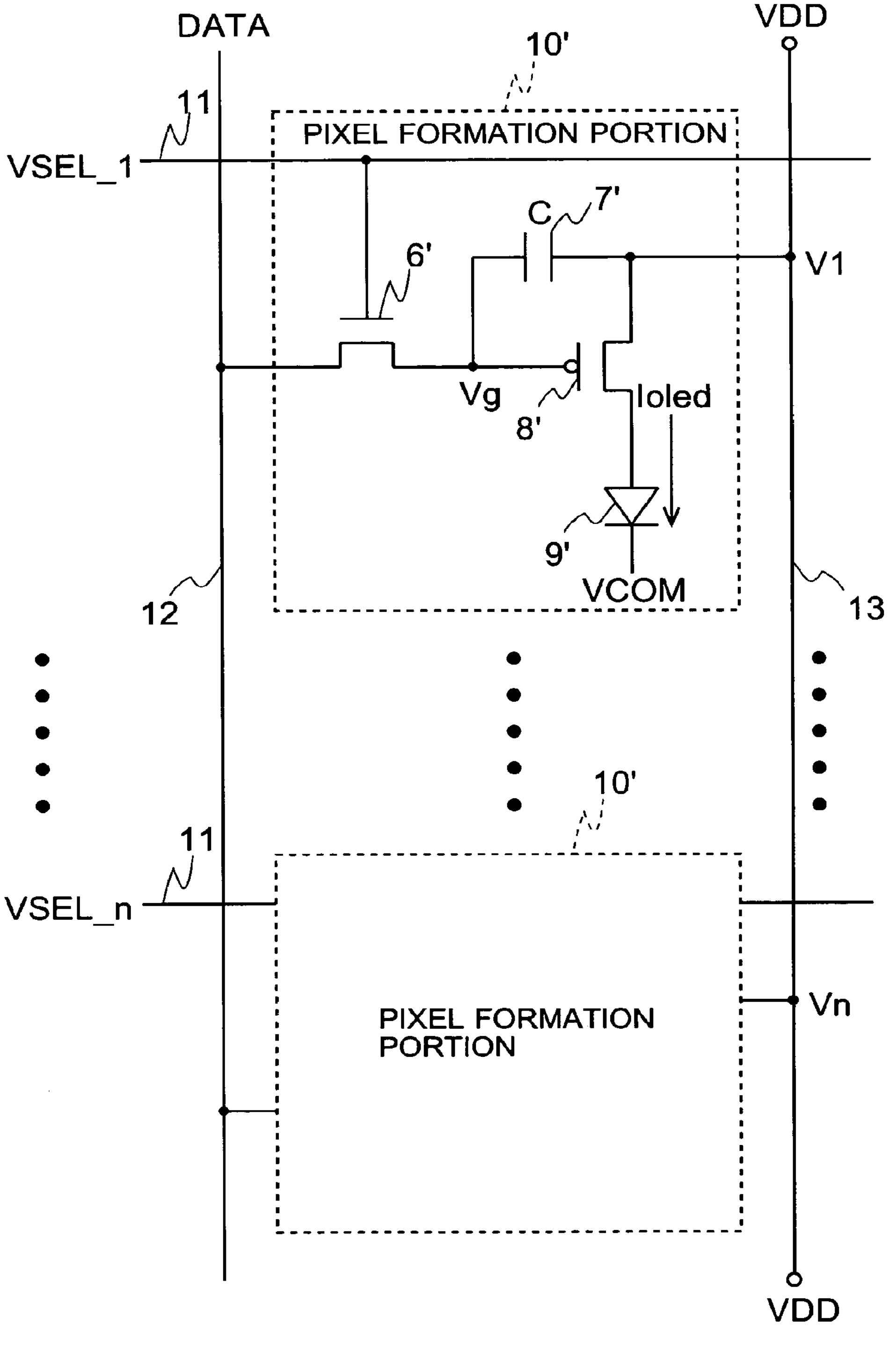
FIG. 13 shows an equivalent circuit of a display element according to an embodiment of the present invention, in which current is supplied from two points on both sides (upper and lower side) for each pixel column.

As a second calculation example, the necessary resistance ratio Rx/Re is calculated from the above-noted recursive equations as well as Expression (2) for the case that the pixel resolution and the column pixel number of the display screen of the display device are set to various values. The obtained results are listed in Table 2. It should be noted that different from the first calculation example, the current flowing through the current line 13 is supplied from two points on both sides (upper and lower side) of each display element column, as shown in FIG. 13.

TABLE 2

| Resolution | Column Pixel | Rx/Re at Each Tolerance Value | | | |
|---|---|---|---|---|---|
| PPI | Number N | 2% | 5% | 8% | 10% |
| 100 | 176 | 1.31E+05 | 5.14E+04 | 3.15E+04 | 2.49E+04 |
| 120 | 176 | 1.49E+05 | 5.86E+04 | 3.61E+04 | 2.85E+04 |
| 150 | 176 | 1.70E+05 | 6.70E+04 | 4.14E+04 | 3.28E+04 |
| 170 | 176 | 1.80E+05 | 7.10E+04 | 4.39E+04 | 3.48E+04 |
| 200 | 176 | 1.88E+05 | 7.45E+04 | 4.61E+04 | 3.66E+04 |
| 100 | 220 | 1.73E+05 | 6.74E+04 | 4.11E+04 | 3.23E+04 |
| 120 | 220 | 1.99E+05 | 7.82E+04 | 4.79E+04 | 3.78E+04 |
| 150 | 220 | 2.34E+05 | 9.20E+04 | 5.66E+04 | 4.48E+04 |
| 170 | 220 | 2.52E+05 | 9.95E+04 | 6.14E+04 | 4.86E+04 |
| 200 | 220 | 2.74E+05 | 1.08E+05 | 6.70E+04 | 5.31E+04 |
| 100 | 480 | 4.13E+05 | 1.56E+05 | 9.15E+04 | 7.02E+04 |
| 120 | 480 | 4.92E+05 | 1.88E+05 | 1.12E+05 | 8.63E+04 |
| 150 | 480 | 6.05E+05 | 2.33E+05 | 1.40E+05 | 1.09E+05 |
| 170 | 480 | 6.76E+05 | 2.62E+05 | 1.58E+05 | 1.24E+05 |
| 200 | 480 | 7.76E+05 | 3.02E+05 | 1.84E+05 | 1.44E+05 |
| 100 | 600 | 5.20E+05 | 1.93E+05 | 1.11E+05 | 8.44E+04 |
| 120 | 600 | 6.23E+05 | 2.34E+05 | 1.37E+05 | 1.05E+05 |
| 150 | 600 | 7.72E+05 | 2.94E+05 | 1.75E+05 | 1.35E+05 |
| 170 | 600 | 8.67E+05 | 3.33E+05 | 1.99E+05 | 1.55E+05 |
| 200 | 600 | 1.00E+06 | 3.88E+05 | 2.34E+05 | 1.83E+05 |
| 100 | 768 | 6.66E+05 | 2.41E+05 | 1.36E+05 | 1.01E+05 |
| 120 | 768 | 8.03E+05 | 2.96E+05 | 1.70E+05 | 1.28E+05 |
| 150 | 768 | 1.00E+06 | 3.77E+05 | 2.20E+05 | 1.69E+05 |
| 170 | 768 | 1.13E+06 | 4.29E+05 | 2.53E+05 | 1.95E+05 |
| 200 | 768 | 1.32E+06 | 5.04E+05 | 3.01E+05 | 2.33E+05 |
| 100 | 1080 | 9.25E+05 | 3.20E+05 | 1.71E+05 | 1.23E+05 |
| 120 | 1080 | 1.13E+06 | 4.00E+05 | 2.21E+05 | 1.62E+05 |
| 150 | 1080 | 1.42E+06 | 5.18E+05 | 2.94E+05 | 2.20E+05 |
| 170 | 1080 | 1.61E+06 | 5.95E+05 | 3.42E+05 | 2.58E+05 |
| 200 | 1080 | 1.89E+06 | 7.08E+05 | 4.13E+05 | 3.15E+05 |

It can be seen from Table 2 that, as in the first calculation example, the higher the pixel resolution for the same column pixel number is, the larger is the minimally necessary resistance ratio Rx/Re for the same current variation tolerance value. It also can be seen that the resistance ratios Rx/Re are substantially half those of the first calculation example. For example, if the display screen of the display device is a VGA screen with a pixel resolution of 100 PPI, then the resistance ratio Rx/Re that is minimally necessary in order to keep the current variation per unit length in the column direction within 2% is $4.13\times10^5$, which is about half of the value of the first calculation example. Thus, the electrode resistance Re of the power source line 13 may be about twice higher than in the first calculation example. Thus, it can be seen that the upper limit of the resistance that is minimally necessary in order to satisfy the current variation tolerance can be increased by providing more current supply points (voltage application points) from the current supply portion 2.

Here, referring to Table 2, it can be seen that when the current variation tolerance is set to 5% or to 10%, then the current variation can be kept within the tolerance range for display devices having a display screen with a comparatively low pixel resolution and a comparatively small pixel number, as well as for display devices having a display screen with a comparatively high pixel resolution and a comparatively large pixel number, even when Rx/Re is set to Rx/Re≧1×10$^5$. Furthermore, it can be seen that when the current variation tolerance is set to 5% or to 10% and Rx/Re is set to Rx/Re≧1×10$^6$, then the current variation is kept within the tolerance range even for display devices having a display screen resolution (1920×1080) corresponding to HDTV (high definition television). And when the current variation tolerance is set to 2%, then the current variation can be kept within the tolerance range for almost all display devices, except for display devices having a display screen with a high pixel resolution corresponding to HDTV.

THIRD CALCULATION EXAMPLE

As a third calculation example, the resistance Re when the display device used for the first calculation example is actually configured based on the equivalent circuit shown in FIG. 4 is calculated. The obtained results are listed in Table 3. It should be noted that, based on an ordinary configuration example, it is assumed that the ON resistance of the current control TFT 8' when lit is about 50 kΩ and the ON resistance of the organic EL element 9' is about 10 kΩmm$^2$. Moreover, the numerical aperture at each pixel resolution is assumed to be 50%.

TABLE 3

| Resolution | Column Pixel Number | Element Resistance | Numerical Aperture | Resistance Re [Ω] for Each Tolerance Value | | | |
|---|---|---|---|---|---|---|---|
| PPI | V | Rx [Ω] | [%] | 2% | 5% | 8% | 10% |
| 100 | 176 | 9.80E+05 | 50.0 | 3.31 | 8.63 | 14.42 | 18.55 |
| 120 | 176 | 1.39E+06 | 50.0 | 2.81 | 7.26 | 12.02 | 15.38 |
| 150 | 176 | 2.14E+06 | 50.0 | 2.32 | 5.94 | 9.77 | 12.43 |
| 170 | 176 | 2.74E+06 | 50.0 | 2.09 | 5.35 | 8.76 | 11.12 |
| 200 | 176 | 3.77E+06 | 50.0 | 1.85 | 4.71 | 7.68 | 9.72 |
| 100 | 220 | 9.80E+05 | 50.0 | 2.60 | 6.86 | 11.61 | 15.07 |
| 120 | 220 | 1.39E+06 | 50.0 | 2.19 | 5.72 | 9.57 | 12.33 |
| 150 | 220 | 2.14E+06 | 50.0 | 1.79 | 4.62 | 7.66 | 9.80 |
| 170 | 220 | 2.74E+06 | 50.0 | 1.60 | 4.13 | 6.80 | 8.68 |
| 200 | 220 | 3.77E+06 | 50.0 | 1.40 | 3.59 | 5.88 | 7.48 |
| 100 | 480 | 9.80E+05 | 50.0 | 1.18 | 3.36 | 6.16 | 8.45 |
| 120 | 480 | 1.39E+06 | 50.0 | 0.98 | 2.71 | 4.84 | 6.52 |
| 150 | 480 | 2.14E+06 | 50.0 | 0.78 | 2.11 | 3.67 | 4.86 |
| 170 | 480 | 2.74E+06 | 50.0 | 0.69 | 1.84 | 3.17 | 4.16 |
| 200 | 480 | 3.77E+06 | 50.0 | 0.59 | 1.55 | 2.64 | 3.44 |
| 100 | 600 | 9.80E+05 | 50.0 | 0.96 | 2.83 | 5.38 | 7.57 |
| 120 | 600 | 1.39E+06 | 50.0 | 0.79 | 2.25 | 4.14 | 5.70 |
| 150 | 600 | 2.14E+06 | 50.0 | 0.62 | 1.73 | 3.08 | 4.15 |
| 170 | 600 | 2.74E+06 | 50.0 | 0.55 | 1.50 | 2.63 | 3.51 |
| 200 | 600 | 3.77E+06 | 50.0 | 0.46 | 1.25 | 2.17 | 2.86 |
| 100 | 768 | 9.80E+05 | 50.0 | 0.77 | 2.38 | 4.78 | 6.95 |
| 120 | 768 | 1.39E+06 | 50.0 | 0.63 | 1.86 | 3.59 | 5.09 |
| 150 | 768 | 2.14E+06 | 50.0 | 0.49 | 1.40 | 2.59 | 3.58 |
| 170 | 768 | 2.74E+06 | 50.0 | 0.43 | 1.21 | 2.19 | 2.98 |
| 200 | 768 | 3.77E+06 | 50.0 | 0.36 | 1.00 | 1.78 | 2.38 |
| 100 | 1080 | 9.80E+05 | 50.0 | 0.57 | 1.97 | 4.32 | 6.56 |
| 120 | 1080 | 1.39E+06 | 50.0 | 0.46 | 1.49 | 3.12 | 4.63 |
| 150 | 1080 | 2.14E+06 | 50.0 | 0.36 | 1.09 | 2.16 | 3.10 |
| 170 | 1080 | 2.74E+06 | 50.0 | 0.31 | 0.93 | 1.78 | 2.52 |
| 200 | 1080 | 3.77E+06 | 50.0 | 0.26 | 0.75 | 1.40 | 1.95 |

It should be noted that the combined resistance Rx [Ω] is determined from the above-listed numerical values by the following Expression (3):

$$Rx=10\times10^3/((25.4)^2/3\times\text{numerical aperture}/100)+50\times10^3 \quad (3)$$

Referring to Table 3, it can be seen that when the number of column pixels is around 220, and the electrode resistance Re of the power source line 13 per display element is about 1.4 to 3Ω, then the current variation tolerance per unit length can be set to 2% or less. Here, for display elements with a numerical aperture of about 50% used for a display screen with, for example, a pixel resolution of 100 PPI and a column pixel number of 220, the length Lp of the power source line electrode 13 is about 20 times larger than the electrode width We of the power source line electrode 13, as shown in FIG. 10, so that an electrode having a resistance of about 2Ω should have a sheet resistance of about 0.1Ω/□ (square). Needless to say, by using an electrode material having an even lower sheet resistance, it is possible to make the current variation even smaller.

Moreover, if the column pixel number is comparatively large, for example in the case of an SVGA screen (with 800×RGB×600 pixels and a column pixel number of 600), then, according to Table 3, the resistance Re should be about 0.5 to 1Ω, in order to keep the current variation (and thus the luminance variation) in column direction within 2%. In this case, it is necessary to use an electrode material having a sheet resistance that is even lower than in the above case.

Here, a lowering of the sheet resistance can be achieved by using an electrode material with a low sheet resistance, but it can also be achieved by increasing the electrode thickness. Moreover, to avoid the influence of level differences due to increasing the thickness of the electrode, it is also possible to decrease the current variation without increasing the thickness of the electrode by increasing the number of current supply points (voltage application points) in the display element column to two or more, as in the configuration of the second calculation example.

Considerations Regarding Sub-Pixels

Figure 14:
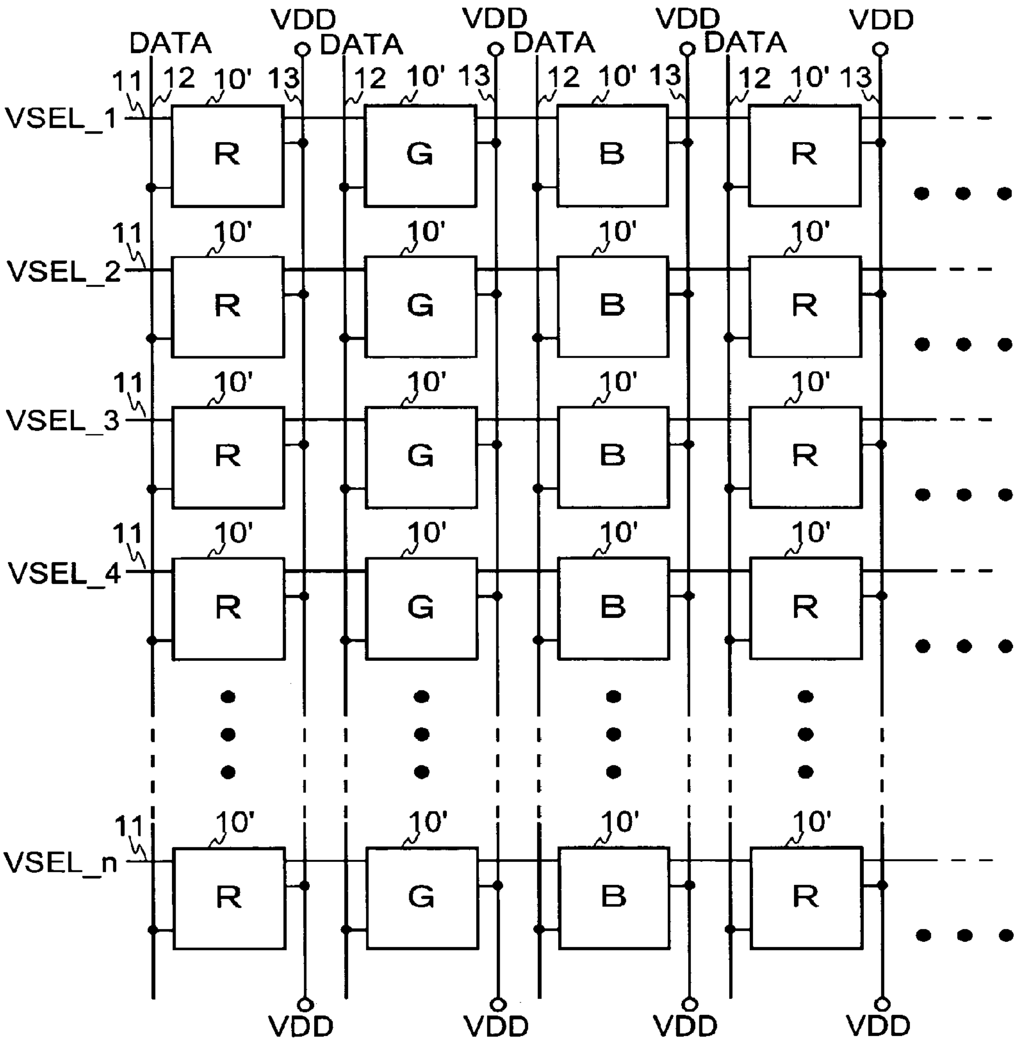
FIG. 14 shows an example of the layout of the pixel formation portions in the display elements forming the three types of sub-pixels for displaying the three colors R, G and B in an embodiment of the present invention.

Referring to FIG. 14, the following are considerations regarding a specific case premised on the foregoing calculation examples, in which one pixel is constituted by three sub-pixels for displaying the three colors R, G and B (red, green and blue). It should be noted that similar considerations also apply to the case that one pixel is constituted by four sub-pixels for displaying the four colors for R, G, B and W (red, green, blue and white). FIG. 14 shows an example of the layout of the pixel formation portions in the display elements forming the three types of sub-pixels for displaying the three colors of RGB. The letters R, G and B in FIG. 14 denote the colors that are displayed by the corresponding pixel formation portions 10'. As shown in FIG. 14, pixel formation portions 10' of the same color are arranged along the data signal lines 12, and sets of three pixel formation portions 10' of the colors R, G and B (in that order) are arranged in repetition along the scanning signal lines 11. One pixel is constituted by such sets of sub-pixels of three colors.

Here, due to differences in their light-emitting material, the display elements forming the sub-pixels of the colors R, G and B have different voltage/current conditions for displaying a predetermined luminance (here, a white luminance of 200 cd/m$^2$). An example of these voltage/current conditions, the ON resistance of the organic EL elements included in the display elements forming the sub-pixels, the emitted luminance of the pixel, and the resistance ratio Rx/Re is listed in Table 4 below. It should be noted that here, for all display elements forming the sub-pixels of the three colors R, G and B, the sheet resistance of the power source line electrode is 0.1Ω/□, the power source line electrode width is 5 μm, the numerical aperture of the pixels is 50%, the pixel size of each of the RGB pixels is 84 μm×252 μm, and column pixel number of the display device including these display elements is 720. Moreover, the ON resistance of the current control TFT 8' when the electro-optical element is lit is about 50 kΩ. Furthermore, as in the second calculation example, the current flowing through the power source line 13 is supplied from two points on both sides (upper and lower side) of each display element column, as shown in FIG. 14.

TABLE 4

| ON resistance of organic EL element [Ωmm²] | | Voltage [V] | Current density [A/mm²] | Luminance emitted by pixel [cd/m²] | Resistance ratio Rx/Re |
|---|---|---|---|---|---|
| R | 1.93E+04 | 6.0 | 3.10E−04 | 218.5 | 3.72E+05 |
| G | 4.02E+04 | 4.5 | 1.12E−04 | 367.1 | 7.63E+05 |
| B | 3.31E+04 | 5.3 | 1.60E−04 | 414.4 | 6.31E+05 |

TABLE 5

| Sub-pixel color | Average width of power source line electrode [μm] | Resistance ratio Rx/Re | Variation of resistance ratio Rx/Re [%] |
|---|---|---|---|
| R | 10.0 | 7.45E+05 | 1.35 |
| G | 5.0 | 7.63E+05 | −1.06 |
| B | 6.0 | 7.57E+05 | −0.29 |

Figure 16:
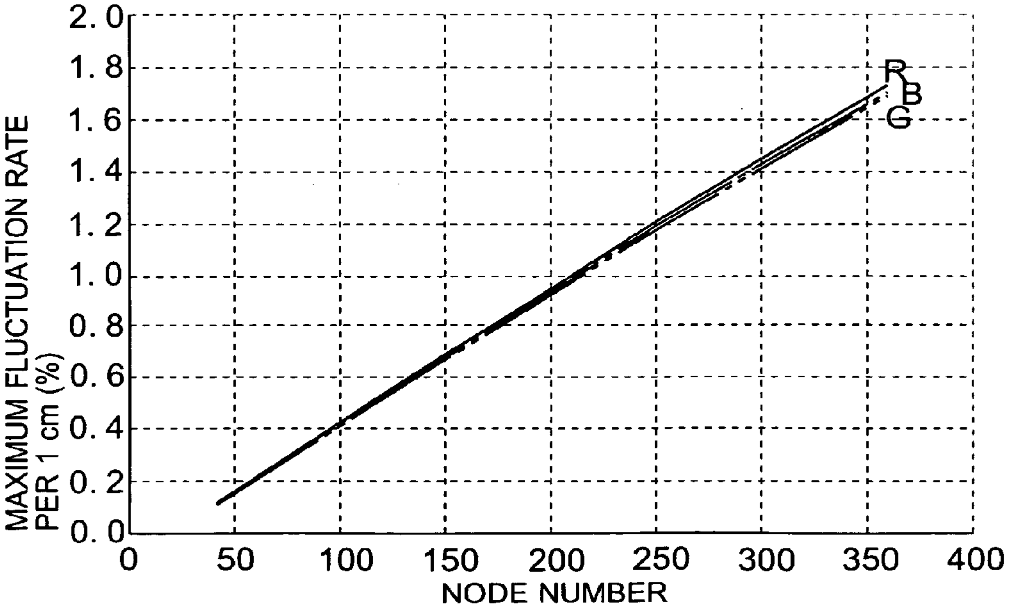
FIG. 16 shows the relation between the node number and the maximum fluctuation rates of the current for a display device according to an embodiment of the present invention, in which the resistance of the power source electrode is adjusted such that the maximum fluctuation rates of the current are the same.
Figure 17:
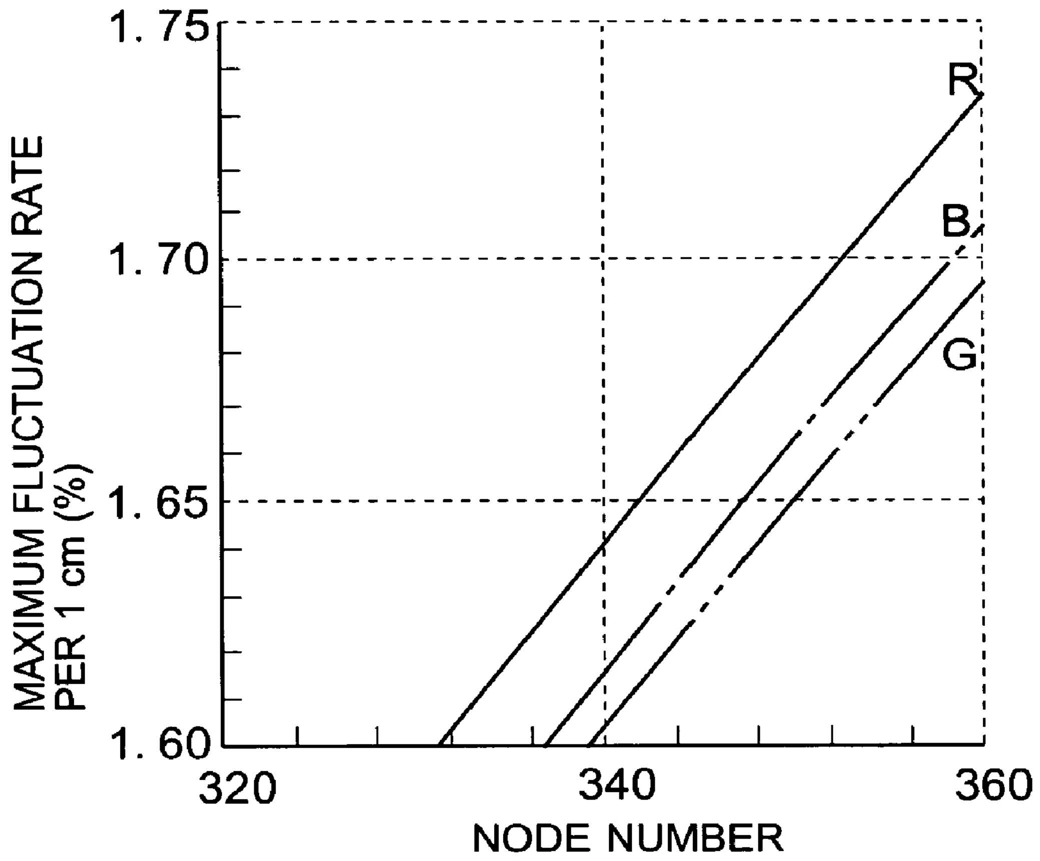
FIG. 17 shows the relation between the nodes 320 to 360 and the maximum fluctuation rates of the current in an embodiment of the present invention.

In this case, the maximum fluctuation rate of the current is substantially the same for the display elements forming the sub-pixels of each of the colors. FIG. 16 shows the relation between the node number and the maximum fluctuation rate of the current for this case. FIG. 17 is a partial magnification of FIG. 16 and shows the relation between the nodes 320 to 360 and the maximum fluctuation rate. The relation between the resistance ratios Rx/Re for the display elements forming the sub-pixels in this case is given by the following Expression (4). It should be noted that the letters R, G and B in the parentheses in Expression (4) denote the type of the sub-pixel; for example, Rx(R)/Re(R) represents the resistance ratio of the display element displaying the color red.

$$Rx(R)/Re(R) \approx Rx(G)/Re(G) \approx Rx(B)/Re(B) \quad (4)$$

Here, it is preferable that the resistance ratios Rx/Re of the display elements forming the sub-pixels of the respective colors ideally are identical, but if the proportion of the variation with respect to the average resistance ratio Rx/Re shown in FIG. 5 varies by not more than several %, as shown in FIGS. 16 and 17, then the resistance ratios Rx/Re may be regarded as identical. Even if the characteristics of the light emitting materials of the display elements forming the sub-pixels of the respective color are different, as noted above, it is possible to ensure that no colored hue is displayed, as long as the resistance ratios (more specifically, the widths of the power source line electrode) are suitably adjusted in accordance with Expression (4). It should be noted that configurations in which electrodes of the power source line having a resistance of the above-noted resistance ratio are suitably arranged within the display element are covered by the description of the structure of the display element shown in FIG. 11, in which the electrode width is partially enlarged.

In addition to this, the maximum fluctuation ratio of the current is consistently lower than 2%/cm (X=2%), which is the tolerance value in LCDs as noted above, so that the luminance variation in the display screen becomes small. Thus, it can be said that the display quality of this display device is sufficiently high.

It should be noted that the present invention is not limited to the display devices and display elements of the foregoing embodiments, and that the present invention can be applied to a variety of configurations with which the advantageous effect of the present invention can be achieved.

Figure 15:
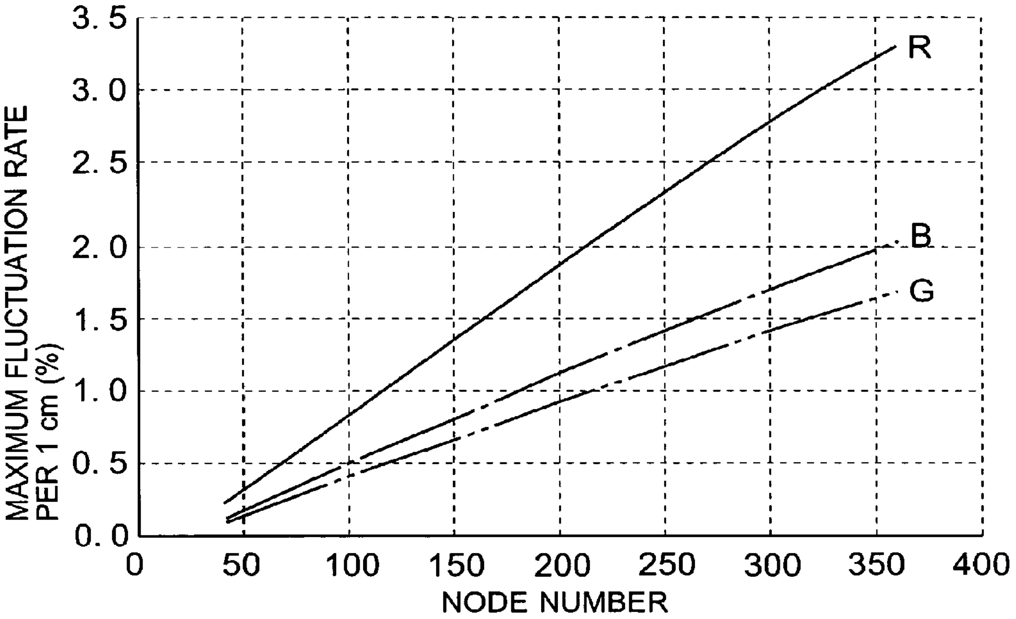
FIG. 15 is a graph showing the relation, in an embodiment of the present invention, between the node number in the display device including display elements for forming sub-pixels and the maximum fluctuation rates of the current between that node and the node 1 cm away therefrom.

Performing the same calculations as for the foregoing calculation examples, the maximum fluctuation ratio of the current per 1 cm differs among the sub-pixels for displaying the colors R, G and B. FIG. 15 is a graph showing the relation between the node number in the display device including the display elements for forming these sub-pixels and the maximum fluctuation rate of the current between that node and the node 1 cm away therefrom. Here, the node number is the number indicating how many pixels the node is removed from the node located at the center of the pixel column. For example, "node 1" means the node that is closest to the center of the pixel column, and "node 360" means the nodes that are located at the two ends of the pixel column.

As shown in FIG. 15, the maximum fluctuation rate of the current at the upper and lower end of the display screen, that is, near the current supply points (near the node 360) differs greatly among the display elements for forming the sub-pixels of the colors R, G and B, and as a result, the luminance of the various colors deviates from the desired value. Therefore, a colored hue can be perceived on the display screen. To address this problem, the maximum current fluctuation rate per 1 cm in the display elements forming the sub-pixels of the various colors should be set to the same level in order to prevent such a colored hue.

Here, in order to equalize the maximum current fluctuation rate in the display elements forming the sub-pixels of the various colors, the resistance ratio Rx/Re may be changed as described above. To change the resistance ratio Rx/Re, it is possible to adjust the resistance of the power source electrodes in the display elements forming the various sub-pixels. Here, the surface area of the pixel aperture portion is not changed and the average width of the power source line electrode is set as shown in Table 5 below. It should be noted that the resistance ratio Rx/Re in this case is set to at least $10^5$, as noted above, but if it is not particularly necessary to consider the luminance variation within the display screen, then it is also possible to prevent the colored hue when the resistance ratio Rx/Re is lower than $10^5$.

With the present invention as described above, the resistance ratio Rx/Re between the resistance Re of the power source line electrode 13 and the combined resistance Rx of a current path from the power source line electrode 13 through the organic EL element 9' and the current control TFT 8' with which each display elements is provided to the common electrode VCOM is set to at least a predetermined value, more specifically to at least $1\times10^5$. Thus, the balance of the current in the display elements can be adjusted, and it becomes possible to keep the luminance variation within a predetermined tolerance range without changing the scale of the circuitry. Therefore, it becomes possible to provide a display element and a display device having little luminance variation within the display screen, a high numerical aperture, an excellent light emission efficiency, and a long lifetime.

While the invention has been described in detail, the foregoing description is in all aspects illustrative and not restrictive. It is understood that numerous other modifications and variations can be devised without departing from the scope of the invention.

This application claims priority upon Japanese Patent Application 2003-173992 titled "DISPLAY ELEMENT AND DISPLAY DEVICE," filed on Jun. 18, 2003, and Japanese Patent Application 2004-76284 titled "DISPLAY ELEMENT AND DISPLAY DEVICE," filed on Mar. 17, 2004, which are incorporated herein by reference.

What is claimed is:

1. A display device comprising:

an image display portion comprising an arrangement of a plurality of display elements, each of the display elements comprising an electro-optical element that is driven by a current, a control element for controlling the current flowing through the electro-optical element, a selection element for applying to the control element a data signal for controlling the control element, a scanning signal line electrode for applying to the selection element a scanning signal for controlling the selection element, a data signal line electrode for applying to the selection element the data signal, and a power source line electrode for applying to the control element the current for driving the electro-optical element; and a current supply portion for applying a current from a current supply point to a series of power supply line electrodes made by connecting the power supply line electrodes of the plurality of display elements in series;

wherein a maximum rate indicating the current variation per one centimeter calculated based on a first current flowing through a first electro-optical element comprised by a first display element which is furthest away from the current supply point and a second current flowing through a second electro-optical element comprised by a second display element different from the first display element is 2%/cm or less when the first and the second electro-optical elements are driven.

2. The display device according to claim 1, wherein the display element forms one of a plurality of types of sub-pixels constituting one pixel and which has substantially the same maximum rate as the other display elements forming the other types of sub-pixels in said one pixel.

3. The display element according to claim 1, wherein the power source line electrode has a plurality of different electrode widths.

4. The display element according to claim 3, wherein the power source line electrode's electrode width at a portion in contact with a region where the electro-optical element is disposed is larger than the power source line electrode's electrode width at other portions.

5. The display device according to claim 1, wherein the current supply portion applies a current from a plurality of current supply points to the power supply line electrodes.

* * * * *